(12) United States Patent
Goto et al.

(10) Patent No.: US 11,396,214 B2
(45) Date of Patent: Jul. 26, 2022

(54) ELECTRIC SUSPENSION DEVICE

(71) Applicant: HONDA MOTOR CO., LTD., Tokyo (JP)

(72) Inventors: Yuya Goto, Wako (JP); Ryoma Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/199,791

(22) Filed: Mar. 12, 2021

(65) Prior Publication Data

US 2021/0291608 A1 Sep. 23, 2021

(30) Foreign Application Priority Data

Mar. 17, 2020 (JP) .............................. JP2020-047006

(51) Int. Cl.
*B60G 17/015* (2006.01)
*B60W 40/11* (2012.01)
*B60W 40/112* (2012.01)

(52) U.S. Cl.
CPC .......... *B60G 17/0157* (2013.01); *B60W 40/11* (2013.01); *B60W 40/112* (2013.01);
(Continued)

(58) Field of Classification Search
CPC .......... B60G 17/0157; B60G 2202/422; B60G 2400/0521; B60G 2400/0522;
(Continued)

(56) References Cited

U.S. PATENT DOCUMENTS

| 5,510,985 A | 4/1996 | Yamaoka et al. |
| 2015/0066295 A1 | 3/2015 | Kanda et al. |
| 2018/0361816 A1* | 12/2018 | Ohno ................. B60G 17/0165 |

FOREIGN PATENT DOCUMENTS

| JP | H05-71006 U | 9/1993 |
| JP | H05-286325 A | 11/1993 |

(Continued)

OTHER PUBLICATIONS

Office Action received in corresponding Japanese application No. 2020-047006 dated Aug. 31, 2021 with English translation (7 pages).

*Primary Examiner* — Yuen Wong
(74) *Attorney, Agent, or Firm* — Rankin, Hill & Clark LLP

(57) ABSTRACT

Provided is an electric suspension device including an electromagnetic actuator that is provided between a body and wheel of a vehicle and generates damping force for damping vibration of the body. It includes: an information acquisition unit that acquires information on the vehicle's sprung speed, pitch rate, and roll rate; a bounce target value computation unit that computes a bounce target value for controlling the vehicle's bounce orientation based on the sprung speed; a pitch target value computation unit that computes a pitch target value for controlling the vehicle's pitch orientation based on the pitch rate; a roll target value computation unit that computes a roll target value for controlling the vehicle's roll orientation based on the roll rate; and a driving control unit that controls driving of the actuator with a control target load which is based on a sum of the bounce, pitch, and roll target values.

3 Claims, 14 Drawing Sheets

(52) U.S. Cl.
CPC .................. *B60G 2202/422* (2013.01); *B60G 2400/0521* (2013.01); *B60G 2400/0522* (2013.01); *B60G 2400/204* (2013.01); *B60G 2400/206* (2013.01); *B60G 2500/10* (2013.01); *B60G 2800/916* (2013.01)

(58) Field of Classification Search
CPC ........ B60G 2400/204; B60G 2400/206; B60G 2500/10; B60G 2800/916; B60G 2202/42; B60G 17/016; B60G 17/06; B60G 17/08; B60G 2400/202; B60G 2400/208; B60G 2400/252; B60G 17/015; B60G 17/018; B60W 40/11; B60W 40/112
See application file for complete search history.

(56) References Cited

FOREIGN PATENT DOCUMENTS

| | | |
|---|---|---|
| JP | H06-127241 A | 5/1994 |
| JP | H06-227229 A | 8/1994 |
| JP | H07-285309 A | 10/1995 |
| JP | H08-244433 A | 9/1996 |
| JP | 2011-189774 A | 9/2011 |
| JP | 2015-047906 A | 3/2015 |
| JP | 2019-001369 A | 1/2019 |

\* cited by examiner

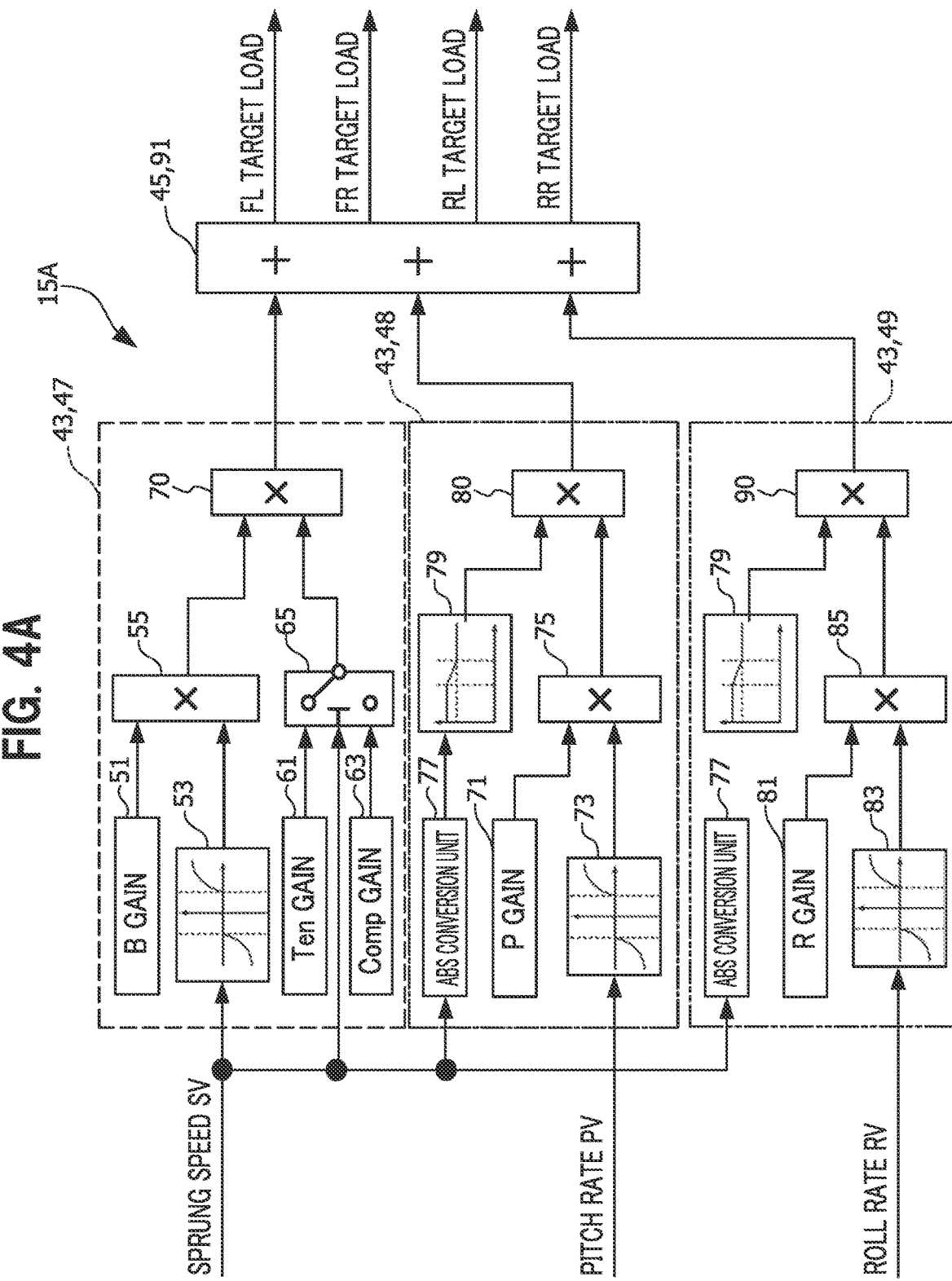

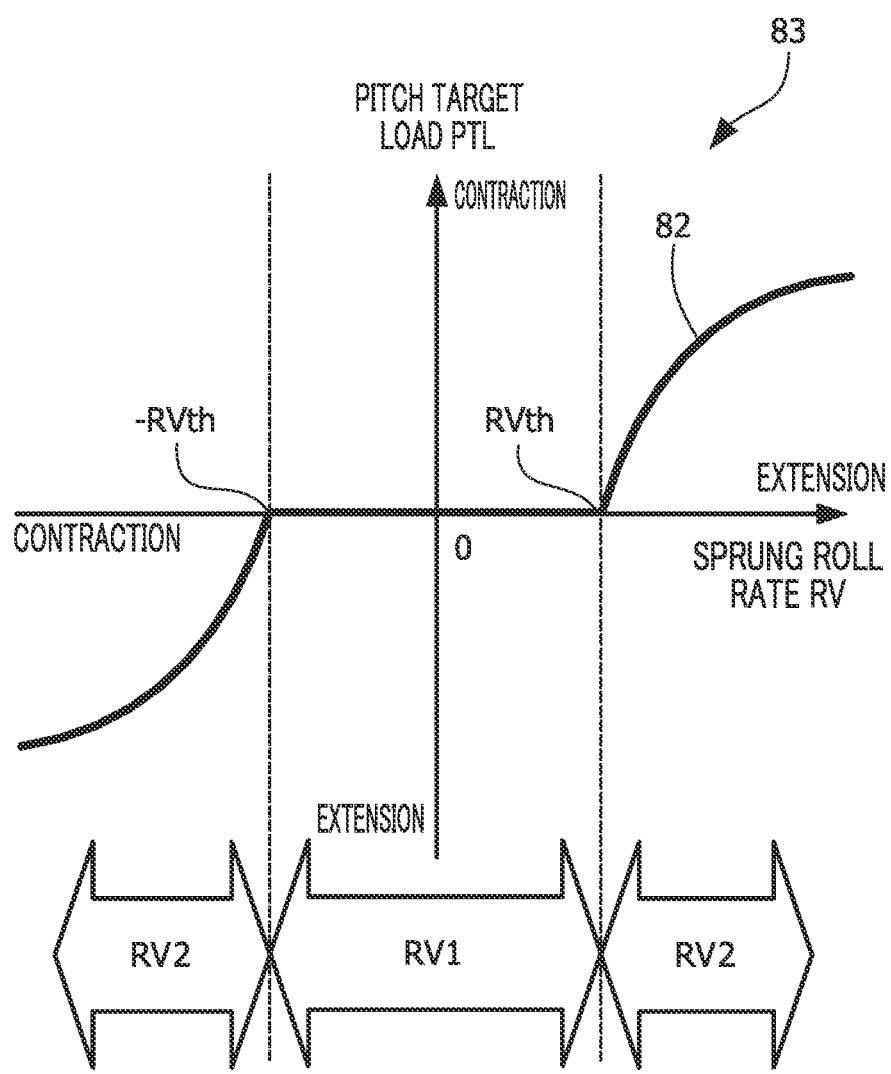

ELECTRIC SUSPENSION DEVICE

This application claims the benefit of foreign priority to Japanese Patent Application No. JP2020-047006, filed Mar. 17, 2020, which is incorporated by reference in its entirety.

BACKGROUND OF THE INVENTION

1. Field of the Invention

The present invention relates an electric suspension device including an actuator that is provided between a body and a wheel of a vehicle and generates damping force for damping vibration of the body.

2. Description of the Related Art

An electric suspension device has heretofore been known which includes an actuator that is provided between a body and a wheel of a vehicle and generates damping force for damping vibration of the body (see Patent Literature 1).

The electric suspension device disclosed in Patent Literature 1 includes: a basic input amount calculation unit that calculates a basic input amount of the vehicle based on an amount of change in wheel speed detected by a wheel speed sensor; a first target current setting unit that sets a first target current based on the basic input amount; a second target current setting unit that sets a second target current based on an acceleration of the body of the vehicle detected by an acceleration sensor; and a control unit that controls a damper (actuator) based on the first target current when a vehicle behavior control device that controls behavior of the vehicle is not operating, and controls the damper based on the second target current when the vehicle behavior control device is operating.

The electric suspension device disclosed in Patent Literature 1 can appropriately control the damping force of the actuator regardless of the caster angle at which the suspension is set and without using vertical G sensors or stroke sensors.

Patent Literature 1: JP 2015-047906 A

SUMMARY OF THE INVENTION

Meanwhile, in the electric suspension device disclosed in Patent Literature 1, control target values for skyhook (bounce) orientation control, pitch orientation control, and roll orientation control are calculated in order to suppress changes in behavior of the vehicle related to the bounce (vertical) orientation, the pitch orientation, and the roll orientation. The largest control target value is selected from among the control target values thus calculated. Then, the driving of the actuator is controlled using the selected control target value. In this way, changes in behavior of the vehicle are suppressed.

Here, in the case of selecting the largest control target value from among the calculated control target values and controlling the driving of the actuator by using the selected control target value as the electric suspension device disclosed in Patent Literature 1 does, the control target values for the orientational directions that are not selected are not reflected on the control of the driving of the actuator. Thus, the electric suspension device disclosed in Patent Literature 1 still has room for improvement in appropriately suppressing changes in behavior of the vehicle.

The present invention has been made in view of the above circumstance and an object thereof is to provide an electric suspension device capable of appropriately suppressing changes in behavior of a vehicle by controlling driving of an actuator with all control target values for the bounce orientation, the pitch orientation, and the roll orientation taken into consideration.

In order to achieve the above object, an electric suspension device including an actuator that is provided between a body and a wheel of a vehicle and generates damping force for damping vibration of the body is provided. The main feature of the electric suspension device is that it includes: an information acquisition unit that acquires information on each of a sprung speed, a pitch rate, and a roll rate of the vehicle; a bounce target value computation unit that computes a bounce target value for controlling a bounce orientation of the vehicle based on the sprung speed; a pitch target value computation unit that computes a pitch target value for controlling a pitch orientation of the vehicle based on the pitch rate; a roll target value computation unit that computes a roll target value for controlling a roll orientation of the vehicle based on the roll rate; and a driving control unit that controls driving of the actuator by using a control target load which is based on a sum of the bounce target value, the pitch target value, and the roll target value.

According to the present invention, it is possible to appropriately suppress changes in behavior of a vehicle by controlling driving of an actuator with all control target values for the bounce orientation, the pitch orientation, and the roll orientation taken into consideration.

BRIEF DESCRIPTION OF THE DRAWINGS

FIG. 4A is a diagram conceptually indicating an internal configuration of a first load control ECU included in a first electric suspension device according to a first embodiment of the present invention.

FIG. 4D is an explanatory diagram of a roll target load map conceptually indicating a relation between a sprung roll rate and a roll target load varying according to the sprung roll rate.

DETAILED DESCRIPTION OF THE EMBODIMENTS

Figure 1:
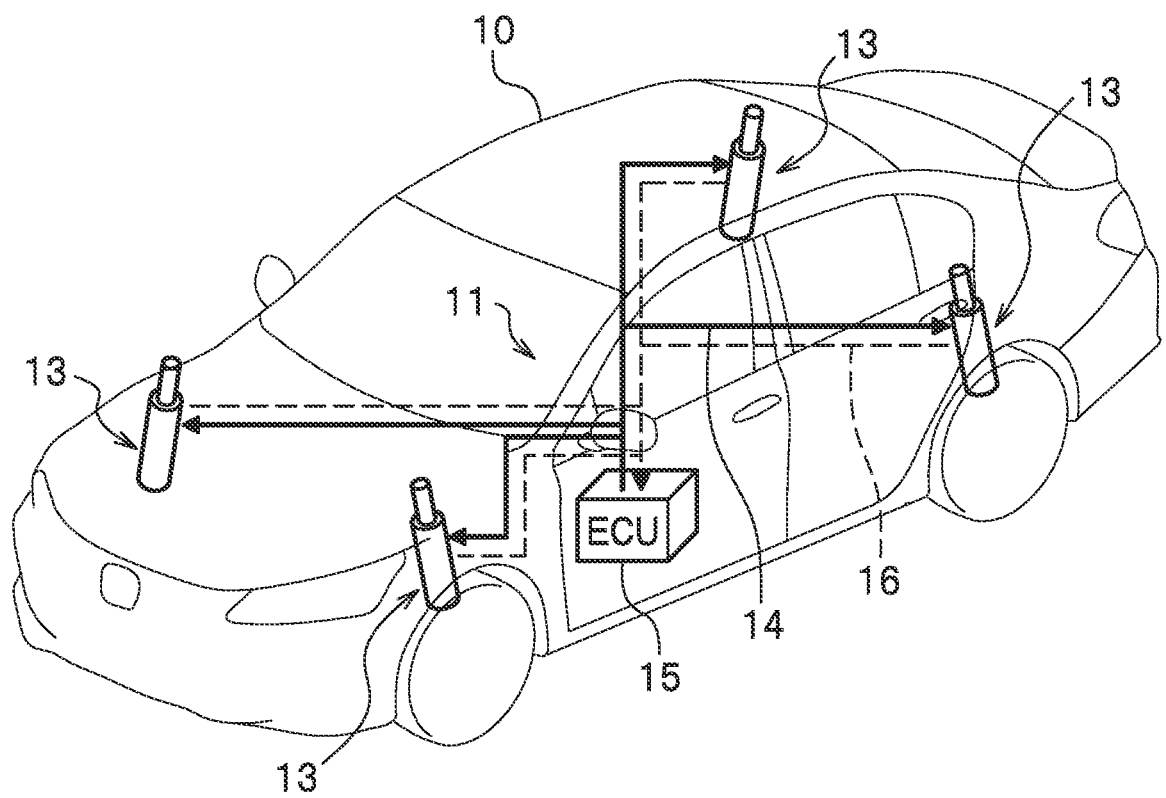
FIG. 1 is a diagram of an entire configuration of an electric suspension device according to the present invention.

Electric suspension devices 11 according to first and second embodiments of the present invention will be described in detail below with reference the drawings as appropriate.

Note that, in the drawings be presented below, members having the same function are denoted by the same reference sign. In this case, as a general rule, a redundant description will be omitted. Moreover, the sizes and shapes of the members may be changed or exaggerated and schematically illustrated for convenience of explanation.

[Basic Configuration Common to Electric Suspension Devices 11 According to First and Second Embodiments]

Firstly, a basic configuration common to the electric suspension devices 11 according to the first and second embodiments of the present invention will be described with reference to FIGS. 1 and 2.

FIG. 1 is a diagram of an entire configuration common to the electric suspension devices 11 according to the first and second embodiments of the present invention. FIG. 2 is a partially cross-sectional view of an electromagnetic actuator 13 forming a part of the electric suspension devices 11. Incidentally, in the following description, electric suspension devices 11A and 11B according to the first and second embodiments of the present invention will be called the electric suspension device 11 according to the present invention when they are collectively referred to.

As illustrated in FIG. 1, the electric suspension device 11 according to the present invention includes a plurality of electromagnetic actuators 13 each provided for a wheel of a vehicle 10, and a load control ECU 15. The plurality of electromagnetic actuators 13 and the load control ECU 15 are connected to each other by respective power supply lines 14 (see the solid lines in FIG. 1) for supplying driving control power from the load control ECU 15 to the plurality of electromagnetic actuators 13 and respective signal lines 16 (see the broken lines in FIG. 1) for sending driving control signals for electric motors 31 (see FIG. 2) from the plurality of electromagnetic actuators 13 to the load control ECU 15.

In the present embodiments, a total of four electromagnetic actuators 13 are disposed, each for one of the front wheels (front left wheel and front right wheel) and the rear wheels (rear left wheel and rear right wheel). The driving of the electromagnetic actuators 13 provided for the respective wheels is controlled independently of each other for extension-contraction operations at the wheels.

In the embodiments of the present invention, the plurality of electromagnetic actuators 13 have a common configuration unless otherwise noted. Thus, the configuration of one electromagnetic actuator 13 will be described as a description of the plurality of electromagnetic actuators 13.

Figure 2:
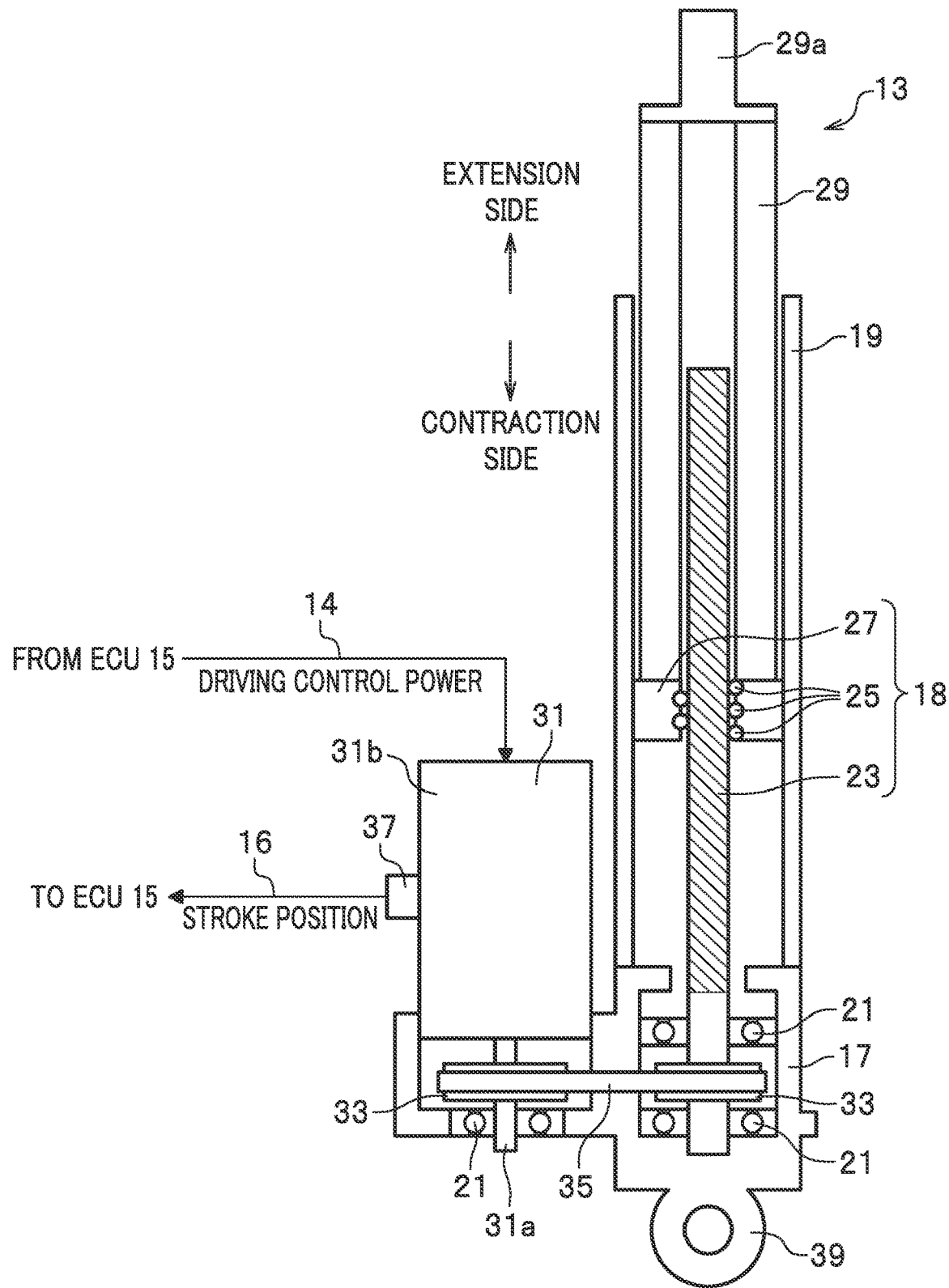
FIG. 2 is a partially cross-sectional view of an electromagnetic actuator included in the electric suspension device according to the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports the proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove on the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves in the axial direction of the outer tube 19 together with the nut 27.

In order to transmit rotational driving force to the ball screw shaft 23, the electromagnetic actuator 13 includes an electric motor 31, a pair of pulleys 33, and a belt member 35, as illustrated in FIG. 2. The electric motor 31 is provided on the base housing 17 in parallel to the outer tube 19. The pulleys 33 are mounted on a motor shaft 31a of the electric motor 31 and the ball screw shaft 23, respectively. Around these pair of pulleys 33 is stretched the belt member 35 for transmitting the rotational driving force of the electric motor 31 to the ball screw shaft 23.

The electric motor 31 is provided with a resolver 37 that detects a rotational angle signal from the electric motor 31. The rotational angle signal from the electric motor 31 detected by the resolver 37 is sent to the load control ECU 15 via the signal line 16. The rotational driving of the electric motor 31 is controlled according to the driving control power supplied from the load control ECU 15 to each of the plurality of the electromagnetic actuators 13 via the corresponding power supply line 14.

Note that the present embodiments employ the layout in which the motor shaft 31a of the electric motor 31 and the ball screw shaft 23 are disposed substantially parallel to each other and coupled to each other, as illustrated in FIG. 2, to shorten the axial dimension of the electromagnetic actuator 13. Alternatively, a layout may be employed in which the motor shaft 31a of the electric motor 31 and the ball screw shaft 23 are disposed coaxially with each other and coupled to each other.

As illustrated in FIG. 2, the electromagnetic actuators 13 according to the present embodiments are provided with a coupling portion 39 at a lower end portion of the base housing 17. This coupling portion 39 is coupled and fixed to an unsprung member not illustrated (such as the lower armor the knuckle on the wheel side). On the other hand, an upper end portion 29a of the inner tube 29 is coupled and fixed to a sprung member not illustrated (such as a strut tower portion on the body side).

In short, the electromagnetic actuator 13 is provided in parallel to a spring member not illustrated provided between the body and the wheel of the vehicle 10.

The electromagnetic actuator 13 configured as above operates as below. Specifically, consider a case where, for example, a thrust related to upward vibration is inputted into the coupling portion 39 from the wheel side of the vehicle 10. In this case, the inner tube 29 and the nut 27 try to descend together relative to the outer tube 19 receiving the thrust related to the upward vibration. In response to this, the ball screw shaft 23 tries to rotate in the direction corresponding to the descent of the nut 27. At this moment, the electric motor 31 is caused to generate a rotational driving force in the direction in which the rotational driving force impede the descent of the nut 27. This rotational driving force of the electric motor 31 is transmitted to the ball screw shaft 23 via the belt member 35.

By exerting a reaction force (damping force) on the ball screw shaft 23 against the thrust related to the upward vibration in this manner, the vibration trying to be transmitted from the wheel side to the body side is damped.

[Internal Configuration of Load Control ECU 15]

Next, configurations inside and around the load control ECU 15 included in the electric suspension device 11 according to the present invention will be described with reference to FIG. 3.

Figure 3:
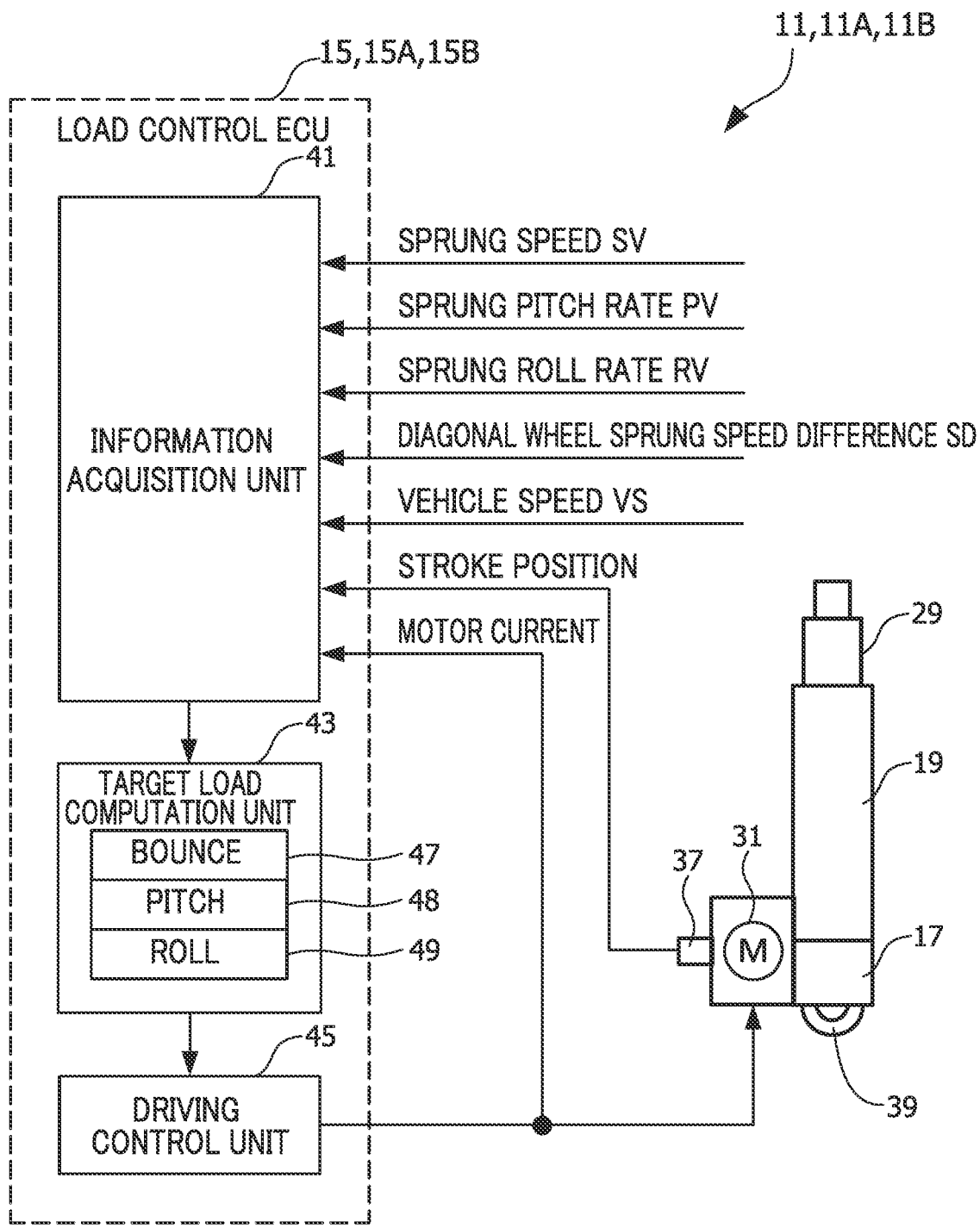
FIG. 3 is a diagram of configurations inside and around a load control ECU included in the electric suspension device according to the present invention.

FIG. 3 is a diagram of the configurations inside and around the load control ECU 15 included in the electric suspension device 11 according to the present invention.

[Electric Suspension Device 11 According to the Present Invention]

The load control ECU 15 included in the electric suspension device 11 according to the present invention includes a microcomputer that performs various arithmetic processes. The load control ECU 15 has a driving control function of controlling the driving of each of the plurality of electromagnetic actuators 13 based on the rotational angle signal from the electric motor 31 detected by the resolver 37, target loads TL, and so on to thereby generate a driving force for a damping operation and an extension-contraction operation of the electromagnetic actuator 13.

In order to implement this driving control function, the load control ECU 15 includes an information acquisition unit 41, a target load computation unit 43, and a driving control unit 45, as illustrated in FIG. 3.

As illustrated in FIG. 3, the information acquisition unit 41 acquires the rotational angle signal from the electric motor 31 detected by the resolver 37 as time-series information on the stroke position and also acquires information on a sprung speed SV by time-differentiating the time-series information on the stroke position. Note that the sprung speed SV is the speed of the sprung mass (body) in the vertical direction.

As illustrated in FIG. 3, the information acquisition unit 41 also acquires time-series information on each of a sprung pitch rate (hereinafter also referred to simply as "pitch rate") PV, a sprung roll rate (hereinafter also referred to simply as "roll rate") RV, and a diagonal wheel sprung speed difference SD. The information on the pitch rate PV and the roll rate RV may be acquired by, for example, a gyro sensor (not illustrated) provided in the vehicle 10.

The information on the diagonal wheel sprung speed difference SD may be acquired by acquiring the information on the sprung speed SV on each diagonal wheel and calculating the difference between them.

As illustrated in FIG. 3, the information acquisition unit 41 further acquires time-series information on each of a vehicle speed VS, the stroke position of the electromagnetic actuator 13, and a motor current for the electric motor 31.

The pieces of information on the sprung speed SV, the pitch rate PV, the roll rate RV, the diagonal wheel sprung speed difference SD, the vehicle speed VS, the stroke position of the electromagnetic actuator 13, and the motor current for the electric motor 31 acquired by the information acquisition unit 41 are sent to the target load computation unit 43.

As illustrated in FIG. 3, the target load computation unit 43 has a function of figuring out the target loads TL, which are target values for a damping operation and an extension-contraction operation of the electromagnetic actuator 13, by computation.

In particular, in the present invention, the target load computation unit 43 includes a bounce target value computation unit 47, a pitch target value computation unit 48, and a roll target value computation unit 49, as illustrated in FIG. 3, for the purpose of controlling the driving of the electromagnetic actuator 13 with all control target values for the bounce orientation, the pitch orientation, and the roll orientation taken into consideration.

The bounce target value computation unit 47 computes a bounce target value for controlling the bounce orientation of the vehicle 10 based on the sprung speed SV.

The pitch target value computation unit 48 computes a pitch target value for controlling the pitch orientation of the vehicle 10 based on the sprung pitch rate PV.

The roll target value computation unit 49 computes a roll target value for controlling the roll orientation of the vehicle 10 based on the sprung roll rate RV.

Internal configurations of the bounce target value computation unit 47, the pitch target value computation unit 48, and the roll target value computation unit 49 included in the target load computation unit 43 will be specifically described later.

The driving control unit 45 calculates a target current value that can achieve the target loads TL figured out by the target load computation unit 43. The driving control unit 45 then controls the driving of the electric motor 31 included in each of the plurality of electromagnetic actuators 13 such that the motor current for the electric motor 31 follows the target current value calculated. The driving of the electric motors 31 of the plurality of electromagnetic actuators 13 is controlled independently of each other.

Note that the driving control unit 45 can preferably use, for example, an inverter control circuit when generating the driving control power to be supplied to each electric motor 31.

[Configuration of Main Part of First Load Control ECU 15A Included in First Electric Suspension Device 11A]

Next, a configuration of a main part of a first load control ECU 15A included in the first electric suspension device 11A according to the first embodiment of the present invention will be described with reference to FIGS. 4A to 4F as appropriate.

Figure 4B:
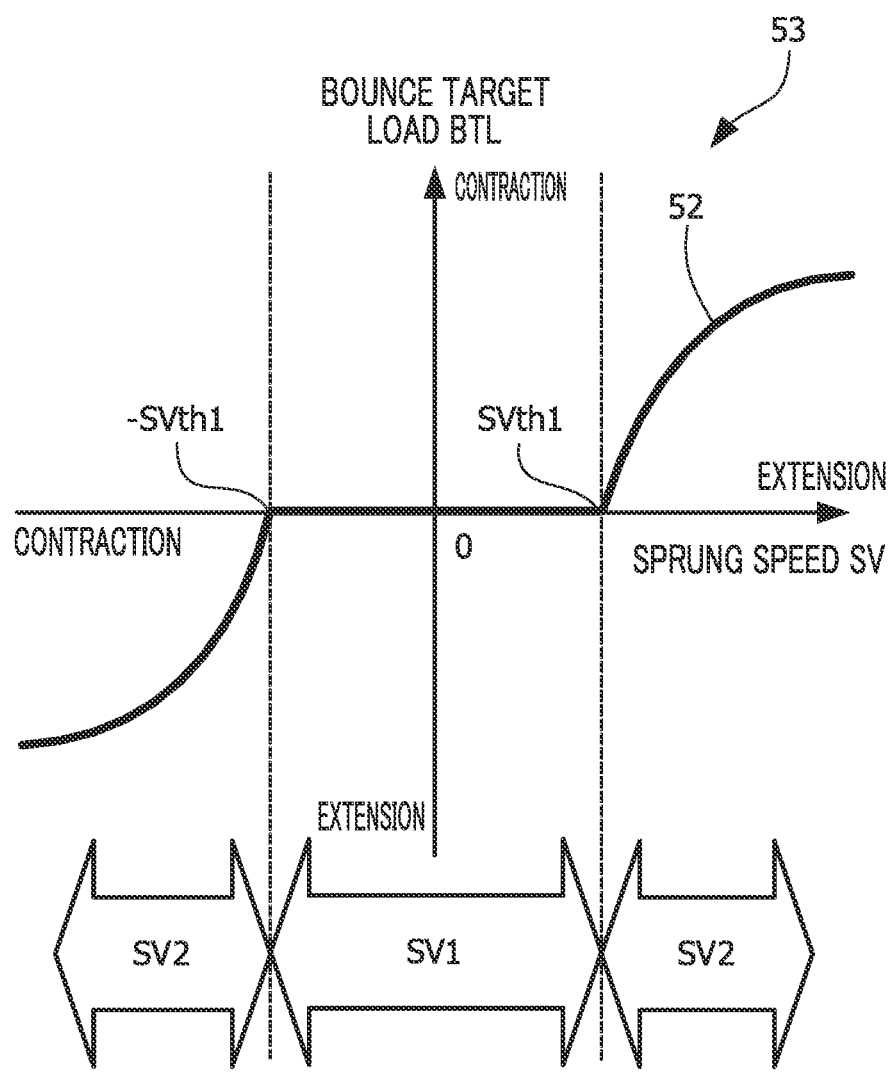
FIG. 4B is an explanatory diagram of a bounce target load map conceptually indicating a relation between a sprung speed and a bounce target load varying according to the sprung speed.
Figure 4C:
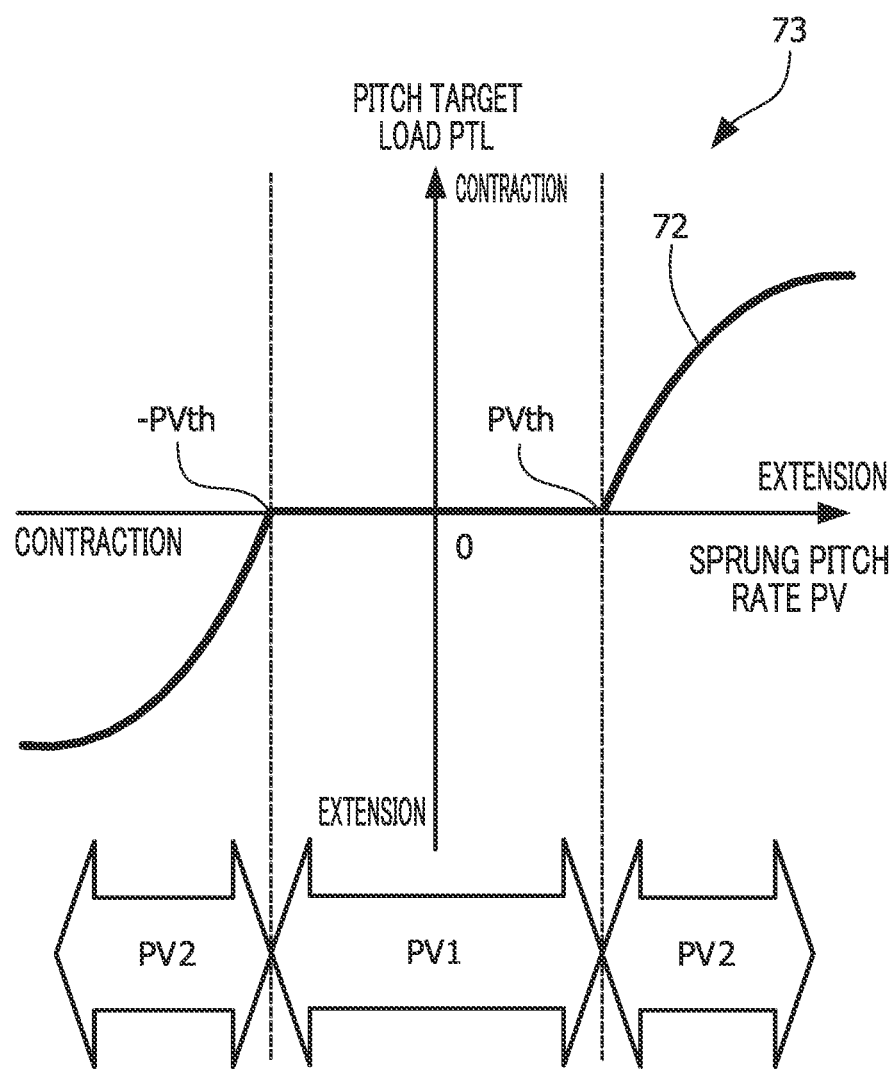
FIG. 4C is an explanatory diagram of a pitch target load map conceptually indicating a relation between a sprung pitch rate and a pitch target load varying according to the sprung pitch rate.
Figure 4E:
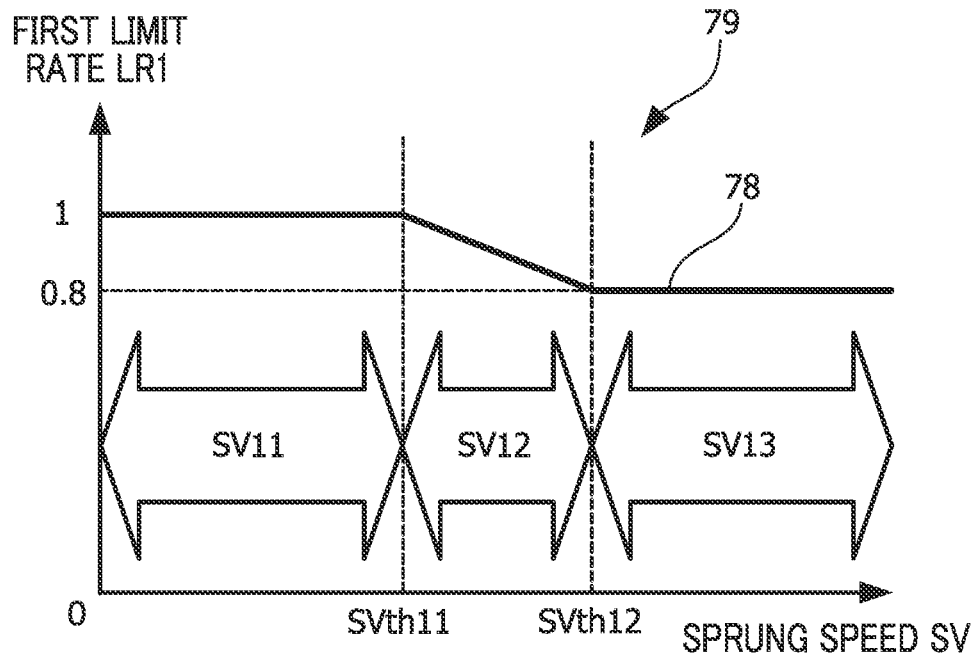
FIG. 4E is an explanatory diagram of a first limit ratio map conceptually indicating a relation between the sprung speed and the value of a first limit ratio varying according to the sprung speed.
Figure 4F:
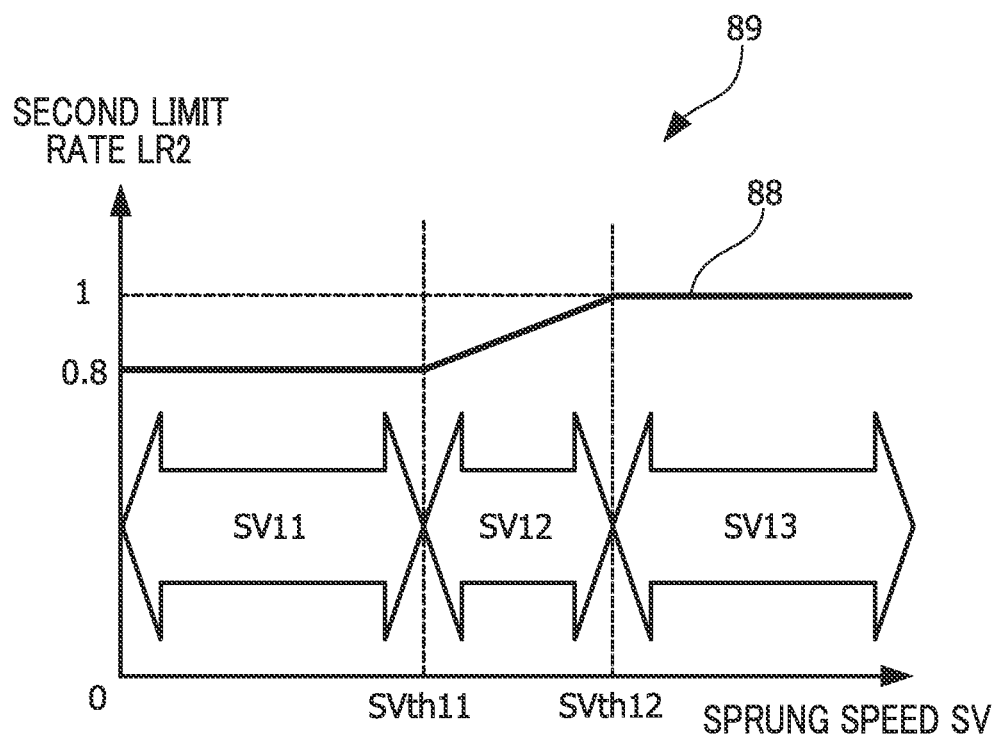
FIG. 4F is an explanatory diagram of a second limit ratio map conceptually indicating a relation between the sprung speed and the value of a second limit ratio varying according to the sprung speed.

FIG. 4A is a diagram conceptually illustrating the configuration of the main part of the first load control ECU 15A included in the first electric suspension device 11A according to the first embodiment of the present invention. FIG. 4B is an explanatory diagram of a bounce target load map conceptually indicating a relation between the sprung speed SV and a bounce target load BTL varying according to the sprung speed SV. FIG. 4C is an explanatory diagram of a pitch target load map conceptually indicating a relation between the pitch rate PV and a pitch target load PTL varying according to the pitch rate PV. FIG. 4D is an explanatory diagram of a roll target load map conceptually indicating a relation between the roll rate RV and a roll target load RTL varying according to the roll rate RV. FIG. 4E is an explanatory diagram of a first limit ratio map conceptually indicating a relation between the sprung speed SV and the value of a limit ratio LR varying according to the sprung speed SV. FIG. 4F is an explanatory diagram of a second limit ratio map conceptually indicating a relation between the sprung speed SC and the value of a limit ratio LR varying according to the sprung speed SV.

The first load control ECU 15A included in the first electric suspension device 11A includes the bounce target value computation unit 47, the pitch target value computation unit 48, the roll target value computation unit 49, and an addition unit 91.

[Internal Configuration of Bounce Target Value Computation Unit 47]

The bounce target value computation unit 47 includes a bounce gain (B gain) setting unit 51, a bounce target load calculation unit 53, a primary multiplication unit 55, an extension-side gain (Ten gain) setting unit 61, a contraction-side gain (Comp gain) setting unit 63, a selection unit 65, and a secondary multiplication unit 70 for the purpose of obtaining a bounce target value that can maintain the bounce orientation appropriately.

A predetermined bounce gain (B gain) is set in the B gain setting unit 51. The B gain set in the B gain setting unit 51 is sent to the primary multiplication unit 55.

The bounce target load calculation unit 53 calculates a value of the bounce target load BTL suitable for the sprung speed SV. When calculating the bounce target load BTL, the bounce target load calculation unit 53 refers to the information on the sprung speed SV acquired by the information acquisition unit 41 and a bounce target load map (see FIGS. 4A and 4B) 52. The bounce target load map 52 is a table conceptually indicating a relation between the sprung speed SV and the bounce target load BTL varying according to the sprung speed SV (bounce target load characteristic).

The value of the bounce target load BTL calculated by the bounce target load calculation unit 53 is sent to the primary multiplication unit 55.

Incidentally, as for the content stored in the bounce target load map 52, target values of a damping force control current may be used in place of the values of the bounce target load BTL.

Now, the bounce target load characteristic in the bounce target load map 52 will be described with reference to FIG. 4B.

The range of change in the sprung speed SV in the bounce target load map 52 includes a first speed range SV1 and a second speed range SV2, as indicated by the divided horizontal axis in FIG. 4B. In the sprung speed SV illustrated along the horizontal axis in FIG. 4B, the range above 0 indicates speeds on the extension side while the range below 0 indicates speeds on the contraction side.

The first speed range SV1 is a speed range in which the sprung speed SV is a first speed threshold value SVth1 or less (|SV−SVth1|≤0). The first speed threshold value SVth1 is a threshold value for defining a normal speed range in the entire speed range of the sprung speed SV. Thus, most of the sprung speeds SV generated in scenes in which the vehicle 10 travels a regular paved road fall within the first speed range SV1.

The second speed range SV2 is a speed range in which the sprung speed SV is greater than the first speed threshold value SVth1 (|SV−SVth1|>0). Thus, the sprung speed SV generated in a rough travel scene such as when wheels of the vehicle 10 run over a bump, for example, reaches the second speed range SV2.

Note that an appropriate value may be set as the first speed threshold value SVth1 by referring to an evaluation result acquired by evaluating a probability density function of the sprung speed SV through tests, simulations, etc. and ensuring, for example, that the distribution ratio of sprung speeds SV appearing in the first speed range SV1 and the second speed range SV2 satisfies a predetermined distribution ratio.

As illustrated in FIG. 4B, the bounce target load characteristic in the first speed range SV1 in the bounce target load map 52 is such that the bounce target load BTL takes a constant value (zero) regardless of the change in the sprung speed SV. That is, when the sprung speed SV is in the first speed range SV1 (−SVth1 <SV<SVth1), the corresponding bounce target load BTL is zero.

On the other hand, as illustrated in FIG. 4B, the bounce target load characteristic in the second speed range SV2 in the bounce target load map 52 is such that the higher the sprung speed SV becomes toward the extension side, the larger the bounce target load BTL orientated toward the contraction side becomes in a manner of an infinite geometric series and the higher the sprung speed SV becomes toward the contraction side, the larger the bounce target load BTL oriented toward the extension side becomes in a manner of an infinite geometric series.

The primary multiplication unit 55 multiplies the B gain set in the B gain setting unit 51 and the value of the bounce target load BTL calculated by the bounce target load calculation unit 53 by each other. The result of the multiplication by the primary multiplication unit 55 is sent to the secondary multiplication unit 70.

A predetermined extension-side gain (Ten gain) for the sprung speed SV is set in the Ten gain setting unit 61. The Ten gain set in the Ten gain setting unit 61 is sent to the selection unit 65.

A predetermined contraction-side gain (Comp gain) for the sprung speed SV is set in the Comp gain setting unit 63. The Comp gain set in the Comp gain setting unit 63 is sent to the selection unit 65.

The selection unit 65 selects one of the pieces of information on the Ten gain set in the Ten gain setting unit 61, the Comp gain set in the Comp gain setting unit 63, and the sprung speed SV by following a predetermined procedure. The piece of information selected by the selection unit 65 is sent to the secondary multiplication unit 70.

The secondary multiplication unit 70 multiplies the result of the multiplication by the primary multiplication unit 55 and the piece of information selected by the selection unit 65 by each other. The result of the multiplication by the secondary multiplication unit 70 is sent to the addition unit 91 (specifically described later).

[Internal Configuration of Pitch Target Value Computation Unit 48]

The pitch target value computation unit 48 includes a pitch gain (P gain) setting unit 71, a pitch target load calculation unit 73, a primary multiplication unit 75, an ABS conversion unit 77, a first limit ratio calculation unit 79, and a secondary multiplication unit 80 for the purpose of obtaining a pitch target value that can maintain the pitch orientation appropriately.

A predetermined pitch gain (P gain) is set in the P gain setting unit 71. The P gain set in the P gain setting unit 71 is sent to the primary multiplication unit 75.

The pitch target load calculation unit 73 calculates a value of the pitch target load PTL suitable for the pitch rate PV. When calculating this, the pitch target load calculation unit 73 refers to the information on the pitch rate PV acquired by the information acquisition unit 41 and a pitch target load map (see FIGS. 4A and 4C) 72 conceptually indicating a relation between the pitch rate PV and the pitch target load PTL varying according to the pitch rate PV (pitch target load characteristic). The value of the pitch target load PTL calculated by the pitch target load calculation unit 73 is sent to the primary multiplication unit 75.

Incidentally, as for the content stored in the pitch target load map 72, target values of a damping force control current may be used in place of the values of the pitch target load PTL.

Now, the pitch target load characteristic in the pitch target load map 72 will be described with reference to FIG. 4C.

The range of change in the pitch rate PV in the pitch target load map 72 includes a first speed range PV1 and a second speed range PV2, as indicated by the divided horizontal axis in FIG. 4C. In the pitch rate PV illustrated along the horizontal axis in FIG. 4C, the range above 0 indicates rates on the extension side while the range below 0 indicates rates on the contraction side. Incidentally, a value obtained by converting the rate of change in the pitch direction of the vehicle 10 into a speed of extension-contraction of the electromagnetic actuator 13 (stroke speed) may be used as the pitch rate PV illustrated along the horizontal axis in FIG. 4C. Similarly, a value obtained by converting a target load in the pitch direction of the vehicle 10 into a target load in the extension-contraction (stroke) direction of the electromagnetic actuator 13 may be used as the pitch target load PTL illustrated along the vertical axis in FIG. 4C.

The first speed range PV1 is a speed range in which the pitch rate PV is a speed threshold value PVth or less (|PV−PVth|≤0). The speed threshold value PVth is a threshold value for defining a normal speed range in the entire speed range of the pitch rate PV. Thus, most of the pitch rates PV generated in scenes in which the vehicle 10 travels a regular paved road fall within the first speed range PV1.

The second speed range PV2 is a speed range in which the pitch rate PV is greater than the speed threshold value PVth (|PV−PVth|>0). Thus, the pitch rate PV generated in a rough travel scene such as when the vehicle 10 travels a wavy road, for example, reaches the second speed range PV2.

Note that an appropriate value may be set as the speed threshold value PVth by referring to an evaluation result acquired by evaluating a probability density function of the pitch rate PV through tests, simulations, etc. and ensuring, for example, that the distribution ratio of pitch rates PV appearing in the first speed range PV1 and the second speed range PV2 satisfies a predetermined distribution ratio.

As illustrated in FIG. 4C, the pitch target load characteristic in the first speed range PV1 in the pitch target load map 72 is such that the pitch target load PTL takes a constant value (zero) regardless of the change in the pitch rate PV. That is, when the pitch rate PV is in the first speed range PV1 (−PVth <PV<PVth), the corresponding pitch target load PTL is zero.

On the other hand, as illustrated in FIG. 4C, the pitch target load characteristic in the second speed range PV2 in the pitch target load map 72 is such that the higher the pitch rate PV becomes toward the extension side, the larger the pitch target load PTL oriented toward the contraction side becomes in a manner of an infinite geometric series and the higher the pitch rate PV becomes toward the contraction side, the larger the pitch target load PTL oriented toward the extension side becomes in a manner of an infinite geometric series.

The primary multiplication unit 75 multiplies the P gain set in the P gain setting unit 71 and the value of the pitch target load PTL calculated by the pitch target load calculation unit 73 by each other. The result of the multiplication by the primary multiplication unit 75 is sent to the secondary multiplication unit 80.

The ABS conversion unit 77 converts the information on the sprung speed SV acquired by the information acquisition unit 41 into an absolute value. The information on the sprung speed SV after the absolute value conversion by the ABS conversion unit 77 is sent to the first limit ratio calculation unit 79.

The first limit ratio calculation unit 79 calculates a value of a first limit ratio LR1 suitable for the sprung speed SV. When calculating the first limit ratio LR1, the first limit ratio calculation unit 79 refers to the information on the sprung speed SV acquired by the information acquisition unit 41 and a first limit ratio map (see FIGS. 4A and 4E) 78. The first limit ratio map 78 is a table conceptually indicating a relation between the sprung speed SV and a limit ratio for an extension-contraction control amount (hereinafter "limit ratio for an extension-contraction control amount" will also be abbreviated as "limit ratio") of the electromagnetic actuator 13 varying according to the sprung speed SV.

The value of the first limit ratio LR1 calculated by the first limit ratio calculation unit 79 is sent to the secondary multiplication unit 80.

Now, the first limit ratio map 78 will be described with reference to FIG. 4E.

As illustrated in FIG. 4E, the range of change in the sprung speed SV in the first limit ratio map 78 includes a total of three speed ranges being an 11th speed range SV11, a 12th speed range SV12, and a 13th speed range SV13 in ascending order of the sprung speed SV.

The 11th speed range SV11 is a speed range in which the sprung speed SV is an 11th speed threshold value SVth11 or less (|SV −SVth11|≤0). As with the first speed threshold value SVth1, the 11th speed threshold value SVth11 is an upper limit threshold value for defining a normal speed range in the entire speed range of the sprung speed SV. Thus, most of the sprung speeds SV generated in scenes in which the vehicle 10 travels a regular paved road fall within the 11th speed range SV11.

Note that in the present embodiment, the 11th speed threshold value SVth11 is set at a value different from the first speed threshold value SVth1 in the bounce target load map 52 (e.g., first speed threshold value SVth1 <11th speed threshold value SVth11). However, the first speed threshold value SVth1 and the 11th speed threshold value SVth11 may be the same value. Alternatively, the magnitude relation may be (first speed threshold value SVth1 >11th speed threshold value SVth11).

Both the 12th speed range SV12 and the 13th speed range SV13 are speed ranges in which the sprung speed SV is greater than the 11th speed threshold value SVth11 (|SV−SVth11|>0). Thus, the sprung speed SV generated in a rough travel scene such as when wheels of the vehicle 10 run over a stair-shaped bump, for example, reaches the 12th speed range SV12 or the 13th speed range SV13.

In the first embodiment, the 12th speed range SV12 and the 13th speed range SV13 are separated by a 12th speed threshold value SVth12. The 12th speed threshold value SVth12 is a threshold value for dividing the high-speed range reached by the sprung speed SV generated in a rough travel scene further into two speed ranges. The sprung speed SV belonging to the 13th speed range SV13 is set to be higher than the sprung speed SV belonging to the 12th speed range SV12.

Note that in the present embodiment, the 12th speed range SV12 and the 13th speed range SV13 are equivalent to the second speed range SV2 in the bounce target load map 52.

On the other hand, as the values of the first limit ratio LR1 corresponding to the speed ranges of the sprung speed SV, a fixed value (1), a variable value (1>LR1 >0.8), and a fixed value (0.8) are set respectively, as illustrated on the vertical axis in FIG. 4E.

In the example of FIG. 4E, the values of the sprung speed SV belonging to the 11th speed range SV11 are replaced with the fixed value (1) of the first limit ratio LR1.

The purpose of this configuration is to not apply a limit with the first limit ratio LR1 in the 11th speed range SV11, in which the sprung speed SV is relatively low, to thereby keep and use the characteristic value of the pitch target load PTL calculated by the pitch target load calculation unit 73.

Also, for example, the values of the sprung speed SV belonging to the 12th speed range SV12 are replaced in a one-to-one correspondence with the values belonging to the range corresponding to the values of the sprung speed SV (1 to 0.8) in accordance with a predetermined linear function connecting the fixed values (1, 0.8) of the first limit ratio LR1. For example, the 11th speed threshold value SVth11 is replaced with the fixed value (1) of the first limit ratio LR1. Also, the 12th speed threshold value SVth12 is replaced with the fixed value (0.8) of the first limit ratio LR1.

The purpose of this configuration is to allocate a variable value having such a linear characteristic that the value of the first limit ratio LR1 gradually decreases with increase in the sprung speed SV in the 12th speed range SV12, in which the sprung speed SV is relatively moderate, to thereby gradually decrease the characteristic value of the pitch target load PTL with the increase in the sprung speed SV and use it.

Further, for example, the values of the sprung speed SV belonging to the 13th speed range SV13 are replaced with the fixed value (0.8) of the first limit ratio LR1.

The purpose of this configuration is to apply a limit specified by the first limit ratio LR1 in the 13th speed range SV13, in which the sprung speed SV is relatively high, to thereby decrease the characteristic value of the pitch target load PTL calculated by the pitch target load calculation unit 73 and use it.

Incidentally, the configuration illustrated in FIG. 4F may be employed instead of the configuration illustrated in FIG. 4E, in which the fixed value (1), the variable value (1>LR1 >0.8), and the fixed value (0.8) are set respectively as the values of the first limit ratio LR1 corresponding to the speed ranges of the sprung speed SV.

Specifically, in the example of FIG. 4F, a second limit ratio calculation unit 89 calculates a value of a second limit ratio LR2 suitable for the sprung speed SV. When calculating the second limit ratio LR2, the second limit ratio calculation unit 89 refers to the information on the sprung speed SV acquired by the information acquisition unit 41 and a second limit ratio map (see FIG. 4F) 88. A fixed value (0.8), a variable value (0.8<LR2<1), and a fixed value (1) are set respectively as the values of the second limit ratio LR2 corresponding to the speed ranges of the sprung speed SV in the second limit ratio map 88.

In the example of FIG. 4F, the values of the sprung speed SV belonging to the 11th speed range SV11 are replaced with the fixed value (0.8) of the second limit ratio LR2.

Also, for example, the values of the sprung speed SV belonging to the 12th speed range SV12 are replaced in a one-to-one correspondence with the values belonging to the range corresponding to the values of the sprung speed SV (0.8 to 1) in accordance with a predetermined linear function connecting the fixed values (0.8, 1) of the second limit ratio LR2. For example, the 11th speed threshold value SVth11 is replaced with the fixed value (0.8) of the second limit ratio LR2. Also, the 12th speed threshold value SVth12 is replaced with the fixed value (1) of the second limit ratio LR2.

Further, for example, the values of the sprung speed SV belonging to the 13th speed range SV13 are replaced with the fixed value (1) of the second limit ratio LR2.

In this case, the value of the second limit ratio LR2 calculated by the second limit ratio calculation unit 88 is sent to the secondary multiplication unit 80.

The secondary multiplication unit 80 multiplies the result of the multiplication by the primary multiplication unit 75 and the value of the first limit ratio LR1 calculated by the first limit ratio calculation unit 79 (or the value of the second limit ratio LR2 calculated by the second limit ratio calculation unit 89) by each other. The result of the multiplication by the secondary multiplication unit 80 is sent to the addition unit 91 (specifically described later).

[Internal Configuration of Roll Target Value Computation Unit 49]

The roll target value computation unit 49 includes a roll gain (R gain) setting unit 81, a roll target load calculation unit 83, a primary multiplication unit 85, an ABS conversion unit 77, a first limit ratio calculation unit 79, and a secondary multiplication unit 90 for the purpose of obtaining a roll target value that can maintain the roll orientation appropriately.

A predetermined roll gain (R gain) is set in the R gain setting unit 81. The R gain set in the R gain setting unit 81 is sent to the primary multiplication unit 85.

The roll target load calculation unit 83 calculates a value of the roll target load RTL suitable for the roll rate RV. When calculating this, the roll target load calculation unit 83 refers to the information on the roll rate RV acquired by the information acquisition unit 41 and a roll target load map (see FIGS. 4A and 4D) 82 conceptually indicating a relation between the roll rate RV and the roll target load RTL varying according to the roll rate RV (roll target load characteristic). The value of the roll target load RTL calculated by the roll target load calculation unit 83 is sent to the primary multiplication unit 85.

Incidentally, as for the content stored in the roll target load map 82, target values of a damping force control current may be used in place of the values of the roll target load RTL.

Now, the roll target load characteristic in the roll target load map 82 will be described with reference to FIG. 4D.

The range of change in the roll rate RV in the roll target load map 82 includes a first speed range RV1 and a second speed range RV2, as indicated by the divided horizontal axis in FIG. 4D. In the roll rate RV illustrated along the horizontal axis in FIG. 4D, the range above 0 indicates rates on the extension side while the range below 0 indicates rates on the contraction side. Incidentally, a value obtained by converting the rate of change in the roll direction of the vehicle 10 into a speed of extension-contraction of the electromagnetic actuator 13 (stroke speed) may be used as the roll rate RV illustrated along the horizontal axis in FIG. 4D. Similarly, a value obtained by converting a target load in the roll direction of the vehicle 10 into a target load in the extension-contraction (stroke) direction of the electromagnetic actuator 13 may be used as the roll target load RTL illustrated along the vertical axis in FIG. 4D.

The first speed range RV1 is a speed range in which the roll rate RV is a speed threshold value RVth or less ($|RV-RVth| \leq 0$). The speed threshold value RVth is a threshold value for defining a normal speed range in the entire speed range of the roll rate RV. Thus, most of the roll rates RV generated in scenes in which the vehicle 10 travels straight on a regular paved road fall within the first speed range RV1.

The second speed range RV2 is a speed range in which the roll rate RV is greater than the speed threshold value RVth (|RV−RVth|>0). Thus, the roll rate RV generated in a rough travel scene such as when the vehicle 10 travels a curved road, for example, reaches the second speed range RV2.

Note that an appropriate value may be set as the speed threshold value RVth by referring to an evaluation result acquired by evaluating a probability density function of the roll rate RV through tests, simulations, etc. and ensuring, for example, that the distribution ratio of roll rates RV appearing in the first speed range RV1 and the second speed range RV2 satisfies a predetermined distribution ratio.

As illustrated in FIG. 4D, the roll target load characteristic in the first speed range RV1 in the roll target load map 82 is such that the roll target load RTL takes a constant value (zero) regardless of the change in the roll rate RV. That is, when the roll rate RV is in the first speed range RV1 (−RVth <RV<RVth), the corresponding roll target load RTL is zero.

On the other hand, as illustrated in FIG. 4D, the roll target load characteristic in the second speed range RV2 in the roll target load map 82 is such that the higher the roll rate RV becomes toward the extension side, the larger the roll target load RTL oriented toward the contraction side becomes in a manner of an infinite geometric series and the higher the roll rate RV becomes toward the contraction side, the larger the roll target load RTL oriented toward the extension side becomes in a manner of an infinite geometric series.

The primary multiplication unit 85 multiplies the R gain set in the R gain setting unit 81 and the value of the roll target load RTL calculated by the roll target load calculation unit 83 by each other. The result of the multiplication by the primary multiplication unit 85 is sent to the secondary multiplication unit 90.

The ABS conversion unit 77 converts the information on the sprung speed SV acquired by the information acquisition unit 41 into an absolute value. The information on the sprung speed SV after the absolute value conversion by the ABS conversion unit 77 is sent to the first limit ratio calculation unit 79.

As described earlier, the first limit ratio calculation unit 79 calculates a value of a first limit ratio LR1 suitable for the sprung speed SV.

The value of the first limit ratio LR1 calculated by the first limit ratio calculation unit 79 is sent to the secondary multiplication unit 90.

The secondary multiplication unit 90 multiplies the result of the multiplication by the primary multiplication unit 85 and the value of the first limit ratio LR1 calculated by the first limit ratio calculation unit 79 (or the value of a second limit ratio LR2 calculated by a second limit ratio calculation unit 89) by each other. The result of the multiplication by the secondary multiplication unit 90 is sent to the addition unit 91 (specifically described below).

The addition unit 91 adds up the result of the multiplication by the secondary multiplication unit 70 belonging to the bounce target value computation unit 47 (bounce target value), the result of the multiplication by the secondary multiplication unit 80 belonging to the pitch target value computation unit 48 (pitch target value), and the result of the multiplication by the secondary multiplication unit 90 belonging to the roll target value computation unit 49 (roll target value).

The addition unit 91 forms apart of the "driving control unit 45" in the present invention.

A combined target load obtained by combining all control target values for the bounce orientation, the pitch orientation, and the roll orientation, which is the result of the addition by the addition unit 91, is sent to the electromagnetic actuator 13 provided for each of the FL (front left), FR (front right), RL (rear left), and RR (rear right) wheels.

[Operation of First Electric Suspension Device 11A]

Figure 5:
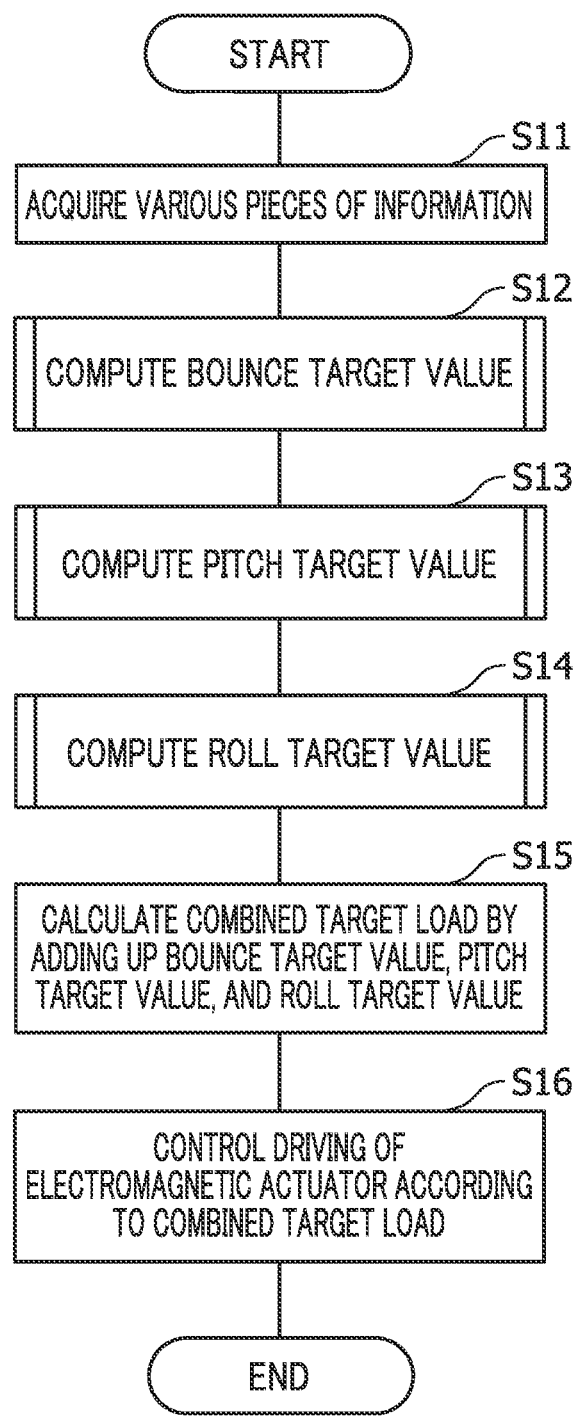
FIG. 5 is a flowchart to be used to describe operation of the first electric suspension device according to the first embodiment.

Next, operation of the first electric suspension device 11A according to the first embodiment of the present invention will be described with reference to FIG. 5. FIG. 5 is a flowchart to be used to describe the operation of the first electric suspension device 11A according to the first embodiment of the present invention.

In step S11 illustrated in FIG. 5, the information acquisition unit 41 of the first load control ECU 15A acquires the rotational angle signal from each electric motor 31 detected by the resolver 37 as time-series information on the stroke position and acquires information on the sprung speed SV by time-differentiating the time-series information on the stroke position.

Further, the information acquisition unit 41 acquires information on the pitch rate PV, the roll rate RV, and the diagonal wheel sprung speed difference SD.

Furthermore, the information acquisition unit 41 acquires information on the vehicle speed VS, the stroke position of the electromagnetic actuator 13, and the motor current for the electric motor 31.

The pieces of information on the sprung speed SV, the pitch rate PV, the roll rate RV, the diagonal wheel sprung speed difference SD, the vehicle speed VS, the stroke position of the electromagnetic actuator 13, and the motor current for the electric motor 31 acquired by the information acquisition unit 41 are sent to the target load computation unit 43.

In step S12, the bounce target value computation unit 47 belonging to the target load computation unit 43 of the first load control ECU 15A computes the bounce target value for controlling the bounce orientation of the vehicle 10 based on the sprung speed SV.

Specifically, in the bounce target value computation unit 47, the primary multiplication unit 55 multiplies the B gain set in the B gain setting unit 51 and the value of the bounce target load BTL calculated by the bounce target load calculation unit 53 by each other. The result of the multiplication by the primary multiplication unit 55 is sent to the secondary multiplication unit 70.

The selection unit 65 selects one of the pieces of information on the Ten gain set in the Ten gain setting unit 61, the Comp gain set in the Comp gain setting unit 63, and the sprung speed SV by following a predetermined procedure. The piece of information selected by the selection unit 65 is sent to the secondary multiplication unit 70.

The secondary multiplication unit 70 multiplies the result of the multiplication by the primary multiplication unit 55 and the piece of information selected by the selection unit 65 by each other. As a result, the bounce target value by the computation by the bounce target value computation unit 47 is obtained. The result of the multiplication by the secondary multiplication unit 70 (bounce target value) is sent to the addition unit 91.

In step S13, the pitch target value computation unit 48 belonging to the target load computation unit 43 of the first load control ECU 15A computes the pitch target value for controlling the pitch orientation of the vehicle 10 based on the pitch rate PV.

Specifically, in the pitch target value computation unit 48, the primary multiplication unit 75 multiplies the P gain set in the P gain setting unit 71 and the value of the pitch target load PTL calculated by the pitch target load calculation unit 73 by each other. The result of the multiplication by the primary multiplication unit 75 is sent to the secondary multiplication unit 80.

The first limit ratio calculation unit 79 calculates a value of the first limit ratio LR1 suitable for the sprung speed SV. The value of the first limit ratio LR1 calculated by the first limit ratio calculation unit 79 is sent to the secondary multiplication unit 80.

The secondary multiplication unit 80 multiplies the result of the multiplication by the primary multiplication unit 75 and the value of the first limit ratio LR1 calculated by the first limit ratio calculation unit 79 (or the value of the second limit ratio LR2 calculated by the second limit ratio calculation unit 89) by each other. As a result, the pitch target value by the computation by the pitch target value computation unit 48 is obtained. The result of the multiplication by the secondary multiplication unit 80 (pitch target value) is sent to the addition unit 91.

In step S14, the roll target value computation unit 49 belonging to the target load computation unit 43 of the first load control ECU 15A computes the roll target value for controlling the roll orientation of the vehicle 10 based on the roll rate RV.

Specifically, in the roll target value computation unit 49, the primary multiplication unit 85 multiplies the R gain set in the R gain setting unit 81 and the value of the roll target load RTL calculated by the roll target load calculation unit 83 by each other. The result of the multiplication by the primary multiplication unit 85 is sent to the secondary multiplication unit 90.

As described earlier, the first limit ratio calculation unit 79 calculates a value of the first limit ratio LR1 suitable for the sprung speed SV. The value of the first limit ratio LR1 calculated by the first limit ratio calculation unit 79 is sent to the secondary multiplication unit 90.

The secondary multiplication unit 90 multiplies the result of the multiplication by the primary multiplication unit 85 and the value of the first limit ratio LR1 calculated by the first limit ratio calculation unit 79 (or the value of the second limit ratio LR2 calculated by the second limit ratio calculation unit 89) by each other. As a result, the roll target value by the computation by the roll target value computation unit 49 is obtained. The result of the multiplication by the secondary multiplication unit 90 (roll target value) is sent to the addition unit 91.

In step S15, the addition unit 91 belonging to the driving control unit 45 of the first load control ECU 15A adds up the result of the multiplication by the secondary multiplication unit 70 belonging to the bounce target value computation unit 47 (bounce target value), the result of the multiplication by the secondary multiplication unit 80 belonging to the pitch target value computation unit 48 (pitch target value), and the result of the multiplication by the secondary multiplication unit 90 belonging to the roll target value computation unit 49 (roll target value). As a result, a combined target load is calculated, which is obtained by combining all control target values for the bounce orientation, the pitch orientation, and the roll orientation.

In step S16, the driving control unit 45 of the first load control ECU 15A controls the driving of each electromagnetic actuator 13 according to the combined target load calculated in step S15.

According to the first electric suspension device 11A, the driving of each electromagnetic actuator 13 is controlled with all control target values for the bounce orientation, the pitch orientation, and the roll orientation taken into consideration. This makes it possible to appropriately suppress changes in behavior of the vehicle 10.

[Configuration of Main Part of Second Load Control ECU 15B Included in Second Electric Suspension Device 11B]

Next, a configuration of a main part of a second load control ECU 15B included in the second electric suspension device 11B according to the second embodiment of the present invention will be described with reference to FIGS. 6A to 6C as appropriate.

Figure 6A:
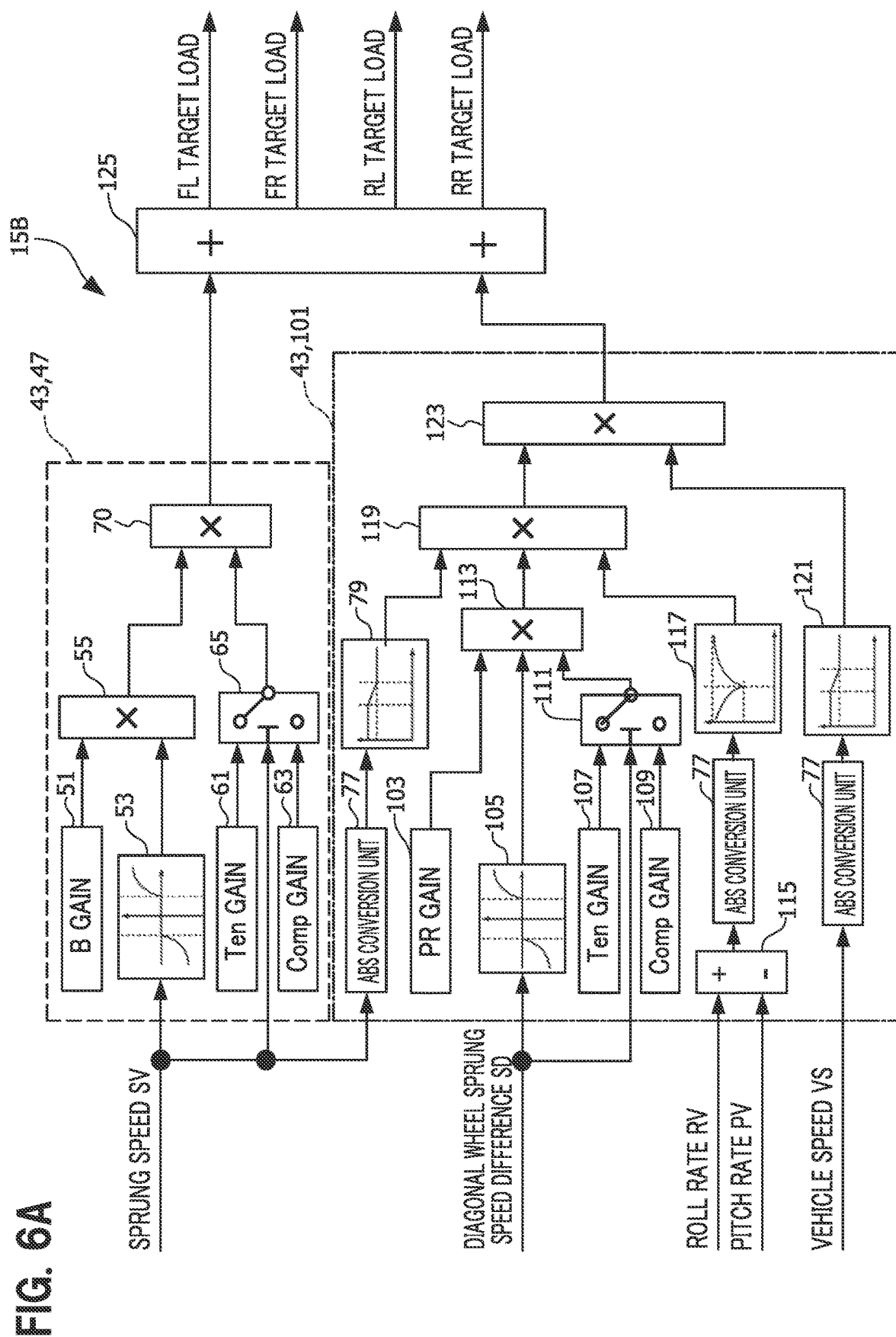
FIG. 6A is a diagram conceptually illustrating an internal configuration of a second load control ECU included in a second electric suspension device according to a second embodiment of the present invention.

FIG. 6A is a diagram conceptually illustrating the configuration of the main part of the second load control ECU 15B included in the second electric suspension device 11B. FIG. 6B is an explanatory diagram of a pitch & roll-combined target load map 104 conceptually indicating a relation between the diagonal wheel sprung speed difference SD and a PR-combined target load PRTL varying according to the diagonal wheel sprung speed difference SD. FIG. 6C is an explanatory diagram of a third limit ratio map 116 conceptually indicating a relation between the difference between the roll rate RV and the pitch rate PV and a third limit ratio LR3 varying according to the difference. FIG. 6D is an explanatory diagram of a fourth limit ratio map 120 conceptually indicating a relation between the vehicle speed VS and a fourth limit ratio LR4 varying according to the vehicle speed VS.

The second load control ECU 15B included in the second electric suspension device 11B includes the bounce target value computation unit 47, a PR-combined target value computation unit 101, and an addition unit 125.

Note that the bounce target value computation unit 47 belonging to the second load control ECU 15B has the same internal configuration as that of the bounce target value computation unit 47 belonging to the first load control ECU 15A. For this reason, description of the internal configuration of the bounce target value computation unit 47 belonging to the second load control ECU 15B is omitted.

[Internal Configuration of PR-Combined Target Value Computation Unit 101]

The PR-combined target value computation unit 101 is aimed at obtaining a PR-combined target value that can maintain both the pitch orientation and the roll orientation appropriately.

The present inventors had been conducting earnest studies on what technical means should be employed in order to perform suppression control for the pitch orientation and suppression control for the roll orientation in a balanced manner while advancing their research and development of the first electric suspension device 11A.

The present inventors have then reached the idea that the diagonal wheel sprung speed difference SD may be employed as a parameter that enables suppression control for the pitch orientation and suppression control for the roll orientation to be executed collectively.

The present inventors also have found that a balance adjustment between the pitch orientation and the roll orientation can be executed as appropriate by using the information on the pitch rate PV and the roll rate RV.

Finally, the present inventors have completed the invention according to the second embodiment capable of achieving an object of performing suppression control for the pitch orientation and suppression control for the roll orientation in a balanced manner by performing the suppression control for the pitch orientation and the suppression control for the roll orientation with the diagonal wheel sprung speed difference SD as a parameter and also executing a balance adjustment between the pitch orientation and the roll orientation with the information on the pitch rate PV and the roll rate RV.

In order to achieve the above object, the PR-combined target value computation unit 101 includes ABS conversion units 77, a first limit ratio calculation unit 79, a pitch & roll gain (PR gain) setting unit 103, a PR-combined target load calculation unit 105, an extension-side gain (Ten gain) setting unit 107, a contraction-side gain (Comp gain) setting unit 109, a selection unit 111, a primary multiplication unit 113, a subtraction unit 115, a third limit ratio calculation unit 117, a secondary multiplication unit 119, a fourth limit ratio calculation unit 121, and a tertiary multiplication unit 123.

One of the ABS conversion units 77 converts the information on the sprung speed SV acquired by the information acquisition unit 41 into an absolute value. The information on the sprung speed SV after the absolute value conversion by the ABS conversion unit 77 is sent to the first limit ratio calculation unit 79.

The first limit ratio calculation unit 79 calculates a value of the first limit ratio LR1 suitable for the sprung speed SV. The value of the first limit ratio LR1 calculated by the first limit ratio calculation unit 79 is sent to the secondary multiplication unit 119.

A predetermined pitch & roll gain (PR gain) is set in the PR gain setting unit 103. The PR gain set in the PR gain setting unit 103 is sent to the primary multiplication unit 113.

The PR-combined target load calculation unit 105 calculates a value of the PR-combined target load PRTL suitable for the diagonal wheel sprung speed difference SD. When calculating this, the PR-combined target load calculation unit 105 refers to the information on the diagonal wheel sprung speed difference SD acquired by the information acquisition unit 41 and the PR-combined target load map (see FIGS. 6A and 6B) 104 conceptually indicating the relation between the diagonal wheel sprung speed difference SD and the PR-combined target load PRTL varying according to the diagonal wheel sprung speed difference SD (PR-combined target load characteristic). The value of the PR-combined target load PRTL calculated by the PR-combined target load calculation unit 105 is sent to the primary multiplication unit 113.

Incidentally, as for the content stored in the PR-combined target load map 104, target values of a damping force control current may be used in place of the values of the PR-combined target load PRTL.

Now, the PR-combined target load characteristic in the PR-combined target load map 104 will be described with reference to FIG. 6B.

Figure 6B:
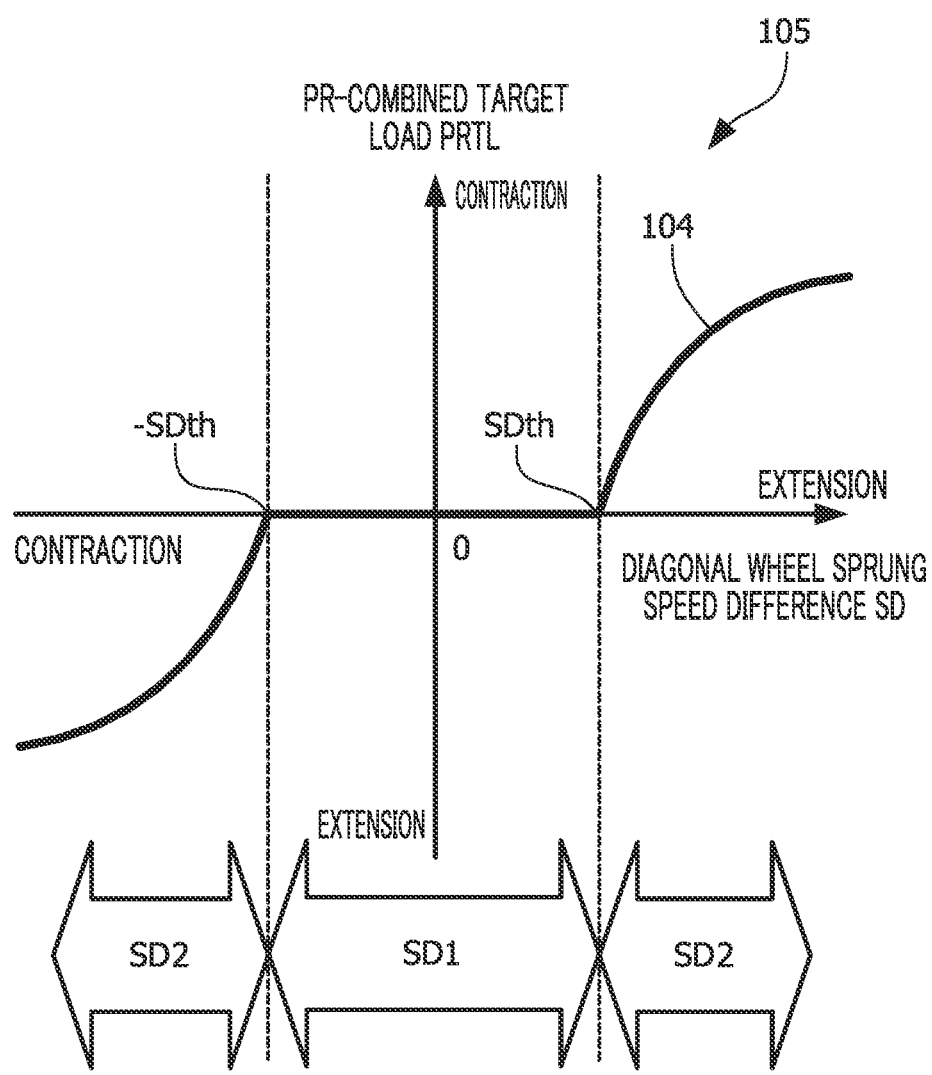
FIG. 6B is an explanatory diagram of a pitch & roll-combined target load map conceptually indicating a relation between a diagonal wheel sprung speed difference and a PR-combined target load varying according to the diagonal wheel sprung speed difference.

The range of change in the diagonal wheel sprung speed difference SD in the PR-combined target load map 104 includes a first speed range SD1 and a second speed range SD2, as indicated by the divided horizontal axis in FIG. 6B. In the diagonal wheel sprung speed difference SD illustrated along the horizontal axis in FIG. 6B, the range above 0 indicates speed differences on the extension side while the range below 0 indicates speed differences on the contraction side.

A speed difference on the extension side means that the direction of the differential speed represented by the diagonal wheel sprung speed difference SD is oriented toward the extension side. On the other hand, a speed difference on the contraction side means that the direction of the differential speed represented by the diagonal wheel sprung speed difference SD is oriented toward the contraction side.

The first speed range SD1 is a speed range in which the diagonal wheel sprung speed difference SD is a speed difference threshold value SDth or less (|SD−SDth|≤0). The speed difference threshold value SDth is a threshold value for defining a normal speed range in the entire speed range of the diagonal wheel sprung speed difference SD. Thus, most of the diagonal wheel sprung speed differences SD occurring in scenes in which the vehicle 10 travels a regular paved road fall within the first speed range SD1.

The second speed range SD2 is a speed range in which the diagonal wheel sprung speed difference SD is greater than the speed difference threshold value SDth (|SD−SDth|>0). Thus, the diagonal wheel sprung speed difference SD occurring in a rough travel scene such as when the vehicle 10 travels rough terrain, for example, reaches the second speed range SD2.

Note that an appropriate value may be set as the speed difference threshold value SDth by referring to an evaluation result acquired by evaluating a probability density function of the diagonal wheel sprung speed difference SD through tests, simulations, etc. and ensuring, for example, that the distribution ratio of diagonal wheel sprung speed differences SD appearing in the first speed range SD1 and the second speed range SD2 satisfies a predetermined distribution ratio.

As illustrated in FIG. 6B, the PR-combined target load characteristic in the first speed range SD1 in the PR-combined target load map 104 is such that the PR-combined target load PRTL takes a constant value (zero) regardless of the change in the diagonal wheel sprung speed difference SD. That is, when the diagonal wheel sprung speed difference SD is in the first speed range SD1 (−SDth<SD<SDth), the corresponding PR-combined target load PRTL is zero.

On the other hand, as illustrated in FIG. 6B, the PR-combined target load characteristic in the second speed range SD2 in the PR-combined target load map 104 is such that the larger the diagonal wheel sprung speed difference SD becomes toward the extension side, the larger the PR-combined target load PRTL oriented toward the contraction side becomes in a manner of an infinite geometric series and the larger the diagonal wheel sprung speed difference SD becomes toward the contraction side, the larger the PR-combined target load PRTL oriented toward the extension side becomes in a manner of an infinite geometric series.

A predetermined extension-side gain (Ten gain) for the diagonal wheel sprung speed difference SD is set in the Ten gain setting unit 107. The Ten gain set in the Ten gain setting unit 107 is sent to the selection unit 111.

A predetermined contraction-side gain (Comp gain) for the diagonal wheel sprung speed difference SD is set in the Comp gain setting unit 109. The Comp gain set in the Comp gain setting unit 109 is sent to the selection unit 111.

The selection unit 111 selects one of the pieces of information on the Ten gain set in the Ten gain setting unit 107, the Comp gain set in the Comp gain setting unit 109, and the diagonal wheel sprung speed difference SD by following a predetermined procedure. The piece of information selected by the selection unit 111 is sent to the primary multiplication unit 113.

The primary multiplication unit 113 multiplies the PR gain set in the PR gain setting unit 103, the value of the PR-combined target load PRTL calculated by the PR-combined target load calculation unit 105, and the piece of information selected by the selection unit 111 by each other. The result of the multiplication by the primary multiplication unit 113 is sent to the secondary multiplication unit 119.

The subtraction unit 115 substrates the value of the pitch rate PV from the value of the roll rate RV. The pitch-roll rate difference (RV −PV), which is the result of the subtraction by the subtraction unit 115, is sent to another ABS conversion unit 77. This subtraction result (RV −PV) will be referred to when the balance adjustment between the pitch orientation and the roll orientation is performed.

Meanwhile, the "pitch-roll rate difference" will also be abbreviated as "PR rate difference" in the following description.

The ABS conversion unit 77 converts the PR rate difference (RV −PV), or the result of the subtraction by the subtraction unit 115, into an absolute value. The information on an ABSPR rate difference (|RV−PV|=ABSPR) after the absolute value conversion (ABS conversion) by the ABS conversion unit 77 is sent to the third limit ratio calculation unit 117.

The third limit ratio calculation unit 117 calculates a value of the third limit ratio LR3 suitable for the ABSPR rate difference (ABSPR). When calculating the third limit ratio LR3, the third limit ratio calculation unit 117 refers to the information on the ABSPR rate difference (ABSPR) and the third limit ratio map (see FIG. 6C) 116. The third limit ratio map 116 is a table conceptually indicating a relation between the ABSPR rate difference (ABSPR) and a limit ratio for an extension-contraction control amount of the electromagnetic actuator 13 varying according to the ABSPR rate difference (ABSPR).

The value of the third limit ratio LR3 calculated by the third limit ratio calculation unit 117 is sent to the secondary multiplication unit 119.

Now, the third limit ratio man 116 will be described with reference to FIG. 6C.

Figure 6C:
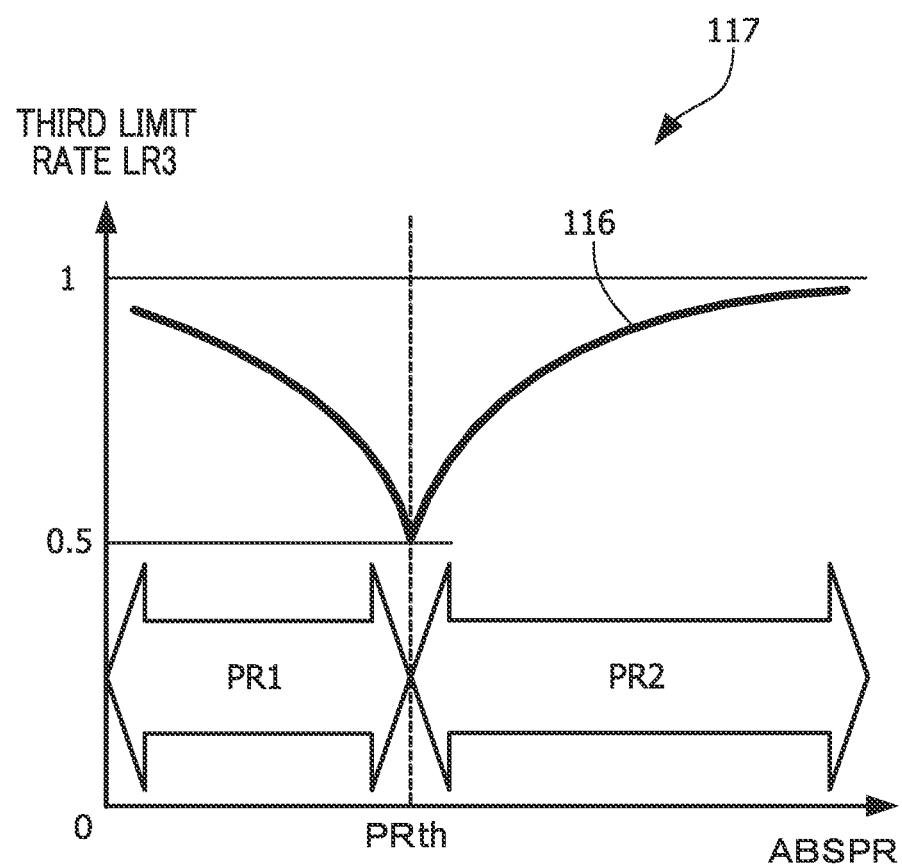
FIG. 6C is an explanatory diagram of a third limit ratio map conceptually indicating a relation between the difference between the sprung roll rate and the sprung pitch rate and a third limit ratio varying according to the difference.
Figure 6D:
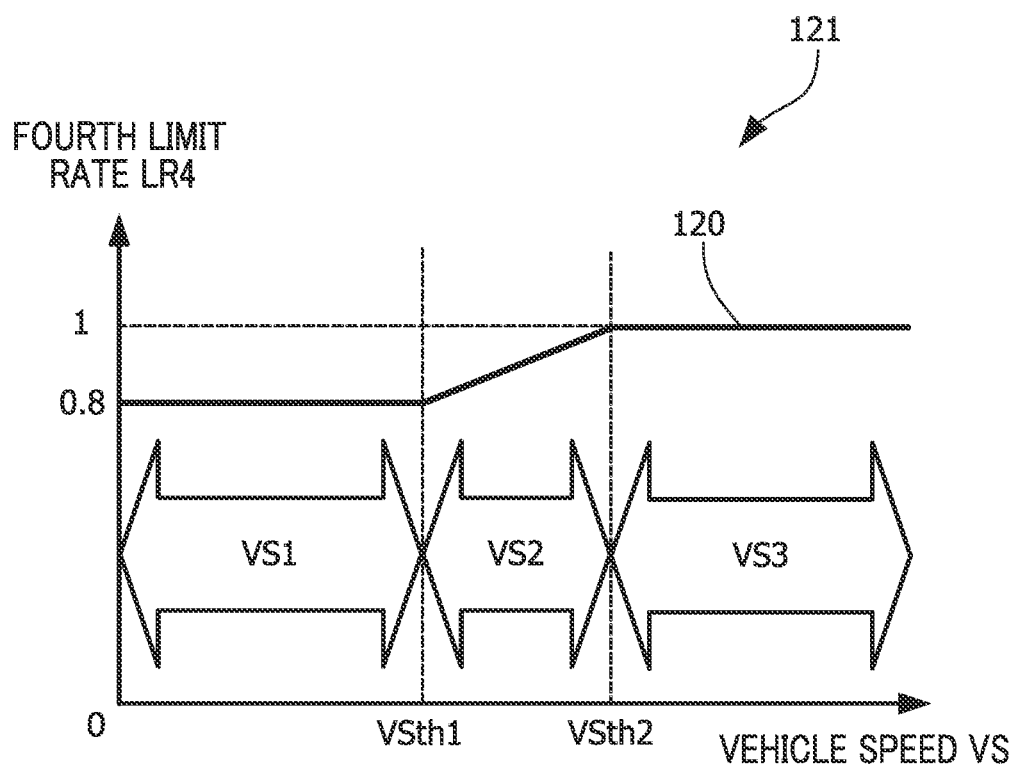
FIG. 6D is an explanatory diagram of a fourth limit ratio map conceptually indicating a relation between a vehicle speed and the value of a fourth limit ratio varying according to the vehicle speed.

As illustrated in FIG. 6C, the range of change in the ABSPR rate difference (ABSPR) in the third limit ratio map 116 includes a total of two speed ranges being a first speed range PR1 and a second speed range PR2 in ascending order with a predetermined speed threshold value PRth therebetween.

The predetermined speed threshold value PRth is a threshold value for determining whether one of the pitch rate PV and the roll rate RV is more dominant than the other in the ASBSPR rate difference (ABSPR) illustrated along the horizontal axis in FIG. 6C (whether the pitch orientation and the roll orientation are imbalanced).

In the case where the pitch orientation and the roll orientation are imbalanced, the ABSPR rate difference (ABSPR) takes a value around 0 or the maximum value on the horizontal axis illustrated in FIG. 6C.

On the other hand, in the case where the pitch orientation and the roll orientation are balanced, the ABSPR rate difference (ABSPR) takes a value around the predetermined speed threshold value PRth on the horizontal axis illustrated in FIG. 6C.

Thus, as illustrated in FIG. 6C, in the third limit ratio map 116, the third limit ratio LR3 takes a value close to (1), which is the maximum value, in the case where the pitch orientation and the roll orientation are imbalanced. On the other hand, the third limit ratio LR3 takes a value close to (0.5), which is the minimum value, in the case where the pitch orientation and the roll orientation are balanced.

A purpose for this configuration is to raise the degree of contribution of the PR-combined target load PRTL based on the diagonal wheel sprung speed difference SD to the final target load in the case where the pitch orientation and the roll orientation are imbalanced. Another purpose is to lower the degree of contribution of the PR-combined target load PRTL based on the diagonal wheel sprung speed difference SD to the final target load in the case where the pitch orientation and the roll orientation are balanced.

The secondary multiplication unit 119 multiplies the value of the first limit ratio LR1 calculated by the first limit ratio calculation unit 79, the result of the multiplication by the primary multiplication unit 113, and the value of the third limit ratio LR3 calculated by the third limit ratio calculation unit 117 by each other. The result of the multiplication by the secondary multiplication unit 119 is sent to the tertiary multiplication unit 123.

Meanwhile, in response to receiving the vehicle speed VS, still another ABS conversion unit 77 converts the vehicle speed VS into an absolute value. The information on the vehicle speed VS after the absolute value conversion by the ABS conversion unit 77 is sent to the fourth limit ratio calculation unit 121.

As illustrated in FIG. 6D, the fourth limit ratio calculation unit 121 calculates a value of the fourth limit ratio LR4 suitable for the vehicle speed VS. When calculating the fourth limit ratio LR4, the fourth limit ratio calculation unit 121 refers to the information on the vehicle speed VS and the fourth limit ratio map (see FIG. 6D) 120. The fourth limit ratio map 120 is a table conceptually indicating a relation between the vehicle speed VS and a limit ratio for an extension-contraction control amount of the electromagnetic actuator 13 varying according to the vehicle speed VS.

The value of the fourth limit ratio LR4 calculated by the fourth limit ratio calculation unit 121 is sent to the tertiary multiplication unit 123.

Now, the fourth limit ratio map 120 will be described with reference to FIG. 6D.

As illustrated in FIG. 6D, the range of change in the vehicle speed VS in the fourth limit ratio map 120 includes a total of three speed ranges being a first speed range VS1, a second speed range VS2, and a third speed range VS3 in ascending order of the vehicle speed VS.

The first speed range VS1 is a speed range in which the vehicle speed VS is a first speed threshold value VSth1 or less (|VS−VSth1|≤0). The first speed threshold value VSth1 is an upper limit threshold value for defining a low speed range in the entire speed range of the vehicle speed VS.

Both the second speed range VS2 and the third speed range VS3 are speed ranges in which the vehicle speed VS is greater than the first speed threshold value VSth1 (|VS−VSth1|>0) and reaches a middle speed and a high speed, respectively.

On the other hand, as the values of the fourth limit ratio LR4 corresponding to the speed ranges of the vehicle speed VS, a fixed value (0.8), a variable value (0.8<LR4<1), and a fixed value (1) are set respectively, as illustrated on the vertical axis in FIG. 6D.

In the example of FIG. 6D, the values of the vehicle speed VS belonging to the first speed range VS1 are replaced with the fixed value (0.8) of the fourth limit ratio LR4.

The purpose of this configuration is to apply a limit specified by the fourth limit ratio LR4 in the first speed range VS1, in which the vehicle speed VS is relatively high, to thereby correct the characteristic value of the PR-combined target load PRTL calculated by the PR-combined target load calculation unit 105 to decrease the characteristic value and use it.

Also, for example, the values of the vehicle speed VS belonging to the second speed range VS2 are replaced in a one-to-one correspondence with the values belonging to the range corresponding to the values of the vehicle speed VS (0.8 to 1) in accordance with a predetermined linear function connecting the fixed values (0.8, 1) of the fourth limit ratio LR4. For example, the first speed threshold value VSth1 is replaced with the fixed value (0.8) of the fourth limit ratio LR4. Also, a second speed threshold value VSth2 is replaced with the fixed value (1) of the fourth limit ratio LR4.

The purpose of this configuration is to allocate a variable value having such a linear characteristic that the value of the fourth limit ratio LR4 gradually increases with increase in the vehicle speed VS in the second speed range VS2, in which the vehicle speed VS is relatively moderate, to thereby gradually increase the characteristic value of the PR-combined target load PRTL with the increase in the vehicle speed VS and use it.

Further, for example, the values of the vehicle speed VS belonging to the third speed range VS3 are replaced with the fixed value (1) of the fourth limit ratio LR4.

The purpose of this configuration is to not apply a limit specified by the fourth limit ratio LR4 in the third speed range VS3, in which the vehicle speed VS is relatively high, to thereby keep and use the characteristic value of the PR-combined target load PRTL as calculated by the PR-combined target load calculation unit 105.

The tertiary multiplication unit 123 multiplies the result of the multiplication by the secondary multiplication unit 119 and the value of the fourth limit ratio LR4 calculated by the fourth limit ratio calculation unit 121 by each other. The result of the multiplication by the tertiary multiplication unit 123 is sent to the addition unit 125.

The addition unit 125 adds up the result of the multiplication by the secondary multiplication unit 70 belonging to the bounce target value computation unit 47 and the result of the multiplication by the tertiary multiplication unit 123 belonging to the PR-combined target value computation unit 101.

The addition unit 125 forms a part of the "driving control unit 45" in the present invention.

A combined target load obtained by combining all control target values for the bounce orientation, the pitch orientation, and the roll orientation, which is the result of the addition by the addition unit 125, is sent to the electromagnetic actuator 13 provided for each of the FL (front left), FR (front right), RL (rear left), and RR (rear right) wheels.

[Operation of Second Electric Suspension Device 11B]

Figure 7:
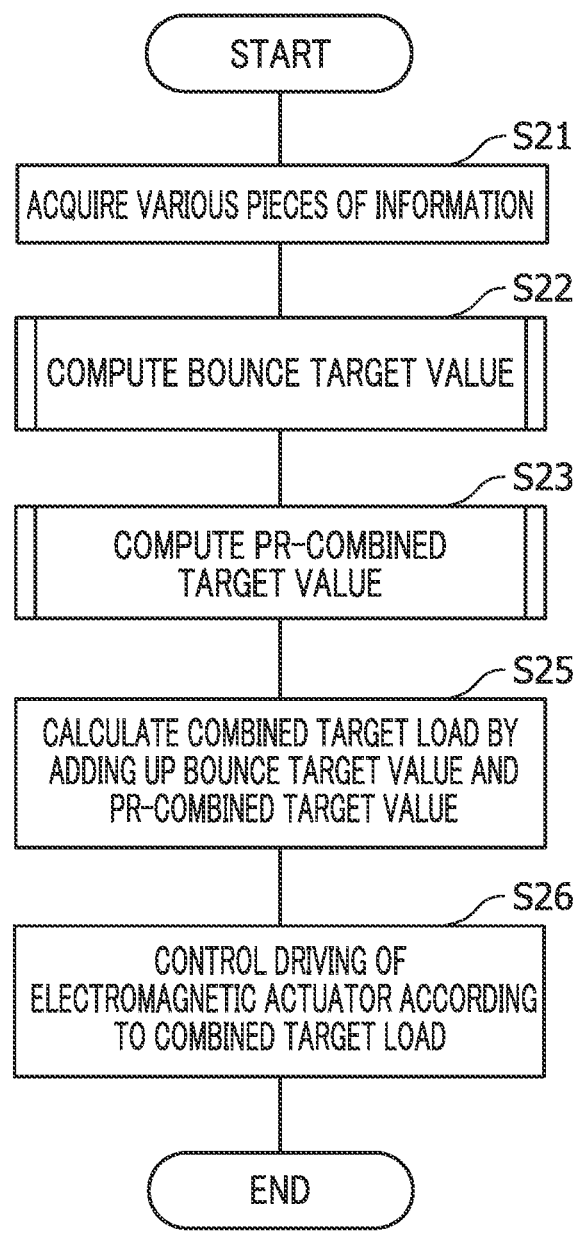
FIG. 7 is a flowchart to be used to describe operation of the second electric suspension device according to the second embodiment.

Next, operation of the second electric suspension device 11B according to the second embodiment of the present invention will be described with reference to FIG. 7. FIG. 7 is a flowchart to be used to describe the operation of the second electric suspension device 11B according to the second embodiment of the present invention.

In step S21 illustrated in FIG. 7, the information acquisition unit 41 of the second load control ECU 15B acquires pieces of information on the sprung speed SV, the pitch rate PV, the roll rate RV, the diagonal wheel sprung speed difference SD, the vehicle speed VS, the stroke position of each electromagnetic actuator 13, and the motor current for the electric motor 31 in a similar manner to step S11 illustrated in FIG. 5.

The pieces of information acquired by the information acquisition unit 41 are sent to the target load computation unit 43.

In step S22, the bounce target value computation unit 47 belonging to the target load computation unit 43 of the second load control ECU 15B computes the bounce target value for controlling the bounce orientation of the vehicle 10 based on the sprung speed SV in a similar manner to step S12 illustrated in FIG. 5. The result of the computation of the bounce target value is sent to the addition unit 91.

In step S23, the PR-combined target value computation unit 101 of the second load control ECU 15B computes the PR-combined target value for suppression control of the pitch orientation and the roll orientation of the vehicle 10 based on the diagonal wheel sprung speed difference SD.

Specifically, in the PR-combined target value computation unit 101, the primary multiplication unit 113 multiplies the PR gain set in the PR gain setting unit 103, the value of the PR-combined target load PRTL calculated by the PR-combined target load calculation unit 105, and the piece of information selected by the selection unit 111 by each other. The result of the multiplication by the primary multiplication unit 113 is sent to the secondary multiplication unit 119.

The third limit ratio calculation unit 117 calculates a value of the third limit ratio LR3 suitable for the ABSPR rate difference (ABSPR). The value of the third limit ratio LR3 calculated by the third limit ratio calculation unit 117 is sent to the secondary multiplication unit 119.

The secondary multiplication unit 119 multiplies the value of the first limit ratio LR1 calculated by the first limit ratio calculation unit 79, the result of the multiplication by the primary multiplication unit 113, and the value of the third limit ratio LR3 calculated by the third limit ratio calculation unit 117 by each other. The result of the multiplication by the secondary multiplication unit 119 is sent to the tertiary multiplication unit 123.

The tertiary multiplication unit 123 multiplies the result of the multiplication by the secondary multiplication unit 119 and the value of the fourth limit ratio LR4 calculated by the fourth limit ratio calculation unit 121. As a result, the PR-combined target value by the computation by the PR-combined target value computation unit 101 is obtained. The result of the multiplication by the tertiary multiplication unit 123 (PR-combined target value) is sent to the addition unit 125.

In step S25, the addition unit 125 belonging to the driving control unit 45 of the second load control ECU 15B adds up the result of the multiplication by the secondary multiplication unit 70 belonging to the bounce target value computation unit 47 (bounce target value) and the PR-combined target value by the computation by the PR-combined target value computation unit 101. As a result, a combined target load is calculated, which is obtained by combining all control target values for the bounce orientation, the pitch orientation, and the roll orientation.

In step S26, the driving control unit 45 of the second load control ECU 15B controls the driving of each electromagnetic actuator 13 according to the combined target load calculated in step S25.

According to the second electric suspension device 11B, the driving of each electromagnetic actuator 13 is controlled with all control target values for the bounce orientation, the pitch orientation, and the roll orientation taken into consideration. This makes it possible to appropriately suppress changes in behavior of the vehicle 10.

[Operation and Advantageous Effects of Electric Suspension Device 11 According to the Present Invention]

An electric suspension device 11 based on a first aspect is, as a premise, an electric suspension device 11 including an actuator (electromagnetic actuator 13) that is provided between a body and a wheel of a vehicle 10 and generates damping force for damping vibration of the body.

The electric suspension device 11 based on the first aspect includes: an information acquisition unit 41 that acquires information on each of a sprung speed SV, a pitch rate PV, and a roll rate RV of the vehicle 10; a bounce target value computation unit 47 that computes a bounce target value for controlling a bounce orientation of the vehicle 10 based on the sprung speed SV; a pitch target value computation unit 48 that computes a pitch target value for controlling a pitch orientation of the vehicle 10 based on the pitch rate PV; a roll target value computation unit 49 that computes a roll target value for controlling a roll orientation of the vehicle 10 based on the roll rate RV; and a driving control unit 45 that controls driving of the electromagnetic actuator 13 by using a control target load which is based on a sum of the bounce target value, the pitch target value, and the roll target value.

In the electric suspension device 11 based on the first aspect, the information acquisition unit 41 acquires the information on each of the sprung speed SV, the pitch rate PV, and the roll rate RV of the vehicle 10. The bounce target value computation unit 47 computes the bounce target value for controlling the bounce orientation of the vehicle 10 based on the sprung speed SV. The pitch target value computation unit 48 computes the pitch target value for controlling the pitch orientation of the vehicle 10 based on the pitch rate PV. The roll target value computation unit 49 computes the roll target value for controlling the roll orientation of the vehicle 10 based on the roll rate RV.

The driving control unit 45 controls the driving of the electromagnetic actuator 13 by using the control target load that is based on the sum of the bounce target value, the pitch target value, and the roll target value.

According to the electric suspension device 11 based on the first aspect, the driving of the electromagnetic actuator 13 is controlled with all control target values for the bounce orientation, the pitch orientation, and the roll orientation taken into consideration. This makes it possible to appropriately suppress changes in behavior of the vehicle 10.

Also, an electric suspension device 11 based on a second aspect is the electric suspension device 11 based on the first aspect, in which the pitch target value computation unit 48 corrects the pitch target value, which is a result of the computation by the pitch target value computation unit 48, based on the information on the sprung speed SV. Also, the roll target value computation unit 49 corrects the roll target value, which is a result of the computation by the roll target value computation unit 49, based on the information on the sprung speed SV.

The driving control unit 45 may be configured to control the driving of the electromagnetic actuator 13 by using a control target load that is based on a sum of the bounce target value, the corrected pitch target value, and the corrected roll target value.

In the electric suspension device 11 based on the second aspect, that the pitch target value computation unit 48 corrects the pitch target value, which is the result of the computation by the pitch target value computation unit 48, based on the information on the sprung speed SV corresponds to the process in the pitch target value computation unit 48 illustrated in FIG. 4A in which the secondary multiplication unit 80 multiplies the result of the multiplication by the primary multiplication unit 75 (pitch target value candidate) by the value of the first limit ratio LR1 calculated by the first limit ratio calculation unit 79 (or the value of the second limit ratio LR2 calculated by the second limit ratio calculation unit 89).

The pitch target value can be reduced, for example, when the sprung speed SV is high, by correcting the pitch target value based on the information on the sprung speed SV. Thus, it is possible to prevent a situation in which the pitch orientation is excessively controlled, for example, when the sprung speed SV is high.

Also, in the electric suspension device 11 based on the second aspect, that the roll target value computation unit 49 corrects the roll target value, which is the result of the computation by the roll target value computation unit 49, based on the information on the sprung speed SV corresponds to the process in the roll target value computation unit 49 illustrated in FIG. 4A in which the secondary multiplication unit 90 multiplies the result of the multiplication by the primary multiplication unit 85 (roll target value candidate) by the value of the first limit ratio LR1 calculated by the first limit ratio calculation unit 79 (or the value of the second limit ratio LR2 calculated by the second limit ratio calculation unit 89).

The roll target value can be reduced, for example, when the sprung speed SV is high, by correcting the roll target value based on the information on the sprung speed SV. Thus, it is possible to prevent a situation in which the roll orientation is excessively controlled, for example, when the sprung speed SV is high.

According to the electric suspension device 11 based on the second aspect, the driving control unit 45 controls the driving of the electromagnetic actuator 13 by using the control target load that is based on the sum of the bounce target value, the corrected pitch target value, and the corrected roll target value. Thus, in addition to the advantageous effect achieved by the electric suspension device 11 based on the first aspect, it is possible to prevent a situation in which the pitch orientation and the roll orientation are excessively controlled, for example, when the sprung speed SV is high.

An electric suspension device 11 based on a third aspect is, as a premise, an electric suspension device 11 including an actuator (electromagnetic actuator 13) that is provided between a body and a wheel of a vehicle 10 and generates damping force for damping vibration of the body, as with the electric suspension device 11 based on the first aspect.

The electric suspension device 11 based on the third aspect includes: an information acquisition unit 41 that acquires a sprung speed SV and a diagonal wheel sprung speed difference SD of the vehicle 10; a bounce target value computation unit 47 that computes a bounce target value for controlling a bounce orientation of the vehicle 10 based on the sprung speed SV; a pitch target value computation unit 48 that computes a pitch target value for controlling a pitch orientation of the vehicle 10 based on the diagonal wheel sprung speed difference SD; a roll target value computation unit 49 that computes a roll target value for controlling a roll orientation of the vehicle 10 based on the diagonal wheel sprung speed difference SD; and a driving control unit 45 that controls driving of the electromagnetic actuator 13 by using a control target load which is based on a sum of the bounce target value, the pitch target value, and the roll target value.

A main difference between the electric suspension device 11 based on the first aspect and the electric suspension device 11 based on the third aspect is that in the electric suspension device 11 based on the third aspect, the pitch target value computation unit 48 and the roll target value computation unit 49 respectively compute the pitch target value and the roll target value based on the common diagonal wheel sprung speed difference SD instead of their individual parameters (the pitch rate PV and the roll rate RV).

According to the electric suspension device 11 based on the third aspect, the driving of the electromagnetic actuator 13 is controlled with all control target values for the bounce orientation, the pitch orientation, and the roll orientation taken into consideration, as with the electric suspension device 11 based on the first aspect. This makes it possible to appropriately suppress changes in behavior of the vehicle 10.

Moreover, according to the electric suspension device 11 based on the third aspect, the pitch target value computation unit 48 and the roll target value computation unit 49 respectively compute the pitch target value and the roll target value based on the common diagonal wheel sprung speed difference SD. Accordingly, as compared to the electric suspension device 11 based on the first aspect, which requires individual control parameters (the pitch rate PV and the roll rate RV), the number of control parameters is smaller. This can make the configuration simpler.

Also, an electric suspension device 11 based on a fourth aspect is the electric suspension device 11 based on the third aspect, in which the information acquisition unit 41 further acquires information on a pitch rate PV and a roll rate RV. The pitch target value computation unit 48 corrects the pitch target value, which is a result of the computation by the pitch target value computation unit 48, based on the information on a more dominant one of the pitch rate PV and the roll rate RV. Also, the roll target value computation unit 49 corrects the roll target value, which is a result of the computation by the roll target value computation unit 49, based on the information on the more dominant one of the pitch rate PV and the roll rate RV.

The driving control unit 45 may be configured to control the driving of the electromagnetic actuator 13 by using a control target load that is based on a sum of the bounce target value, the corrected pitch target value, and the corrected roll target value.

In the electric suspension device 11 based on the fourth aspect, the pitch target value computation unit 48 and the roll target value computation unit 49 respectively correct the pitch target value and the roll target value, which are the results of the computations by the pitch target value computation unit and the roll target value computation unit, based on the information on the more dominant one of the pitch rate PV and the roll rate RV.

Here, when one of the pitch rate PV and the roll rate RV is more dominant, it means that the pitch orientation and the roll orientation is imbalanced. Also, the information on the more dominant one of the pitch rate PV and the roll rate RV means the information having a greater effect on the imbalance between the pitch orientation and the roll orientation.

According to the electric suspension device 11 based on the fourth aspect, the pitch target value computation unit 48 and the roll target value computation unit 49 respectively correct the pitch target value and the roll target value, which are the results of the computations by the pitch target value computation unit and the roll target value computation unit, based on the information on the more dominant one of the pitch rate PV and the roll rate RV. Thus, in addition to the advantageous effect achieved by the electric suspension device 11 based on the third aspect, it is possible to figure out changes in behavior of the vehicle 10 in a timely and accurate manner and thus enhance the advantageous effect of suppressing changes in behavior of the vehicle 10.

Also, an electric suspension device 11 based on a fifth aspect is the electric suspension device 11 based on the third aspect, in which the information acquisition unit 41 further acquires information on a vehicle speed VS of the vehicle 10. The pitch target value computation unit 48 corrects the pitch target value, which is a result of the computation by the pitch target value computation unit 48, based on the vehicle speed VS such that the higher the vehicle speed VS, the larger the pitch target value. Also, the roll target value computation unit 49 corrects the roll target value, which is a result of the computation by the roll target value computation unit 49, based on the vehicle speed VS such that the higher the vehicle speed VS, the larger the roll target value.

The driving control unit 45 may be configured to control the driving of the electromagnetic actuator 13 by using a control target load that is based on a sum of the bounce target value, the corrected pitch target value, and the corrected roll target value.

In the electric suspension device 11 based on the fifth aspect, the pitch target value computation unit 48 and the roll target value computation unit 49 respectively correct the pitch target value and the roll target value, which are the results of the computations by the pitch target value computation unit and the roll target value computation unit, such that the higher the vehicle speed VS, the larger the pitch target value and the roll target value.

Here, the higher the vehicle speed VS, the larger changes in behavior related to the pitch orientation and the roll orientation.

Thus, by respectively correcting the pitch target value and the roll target value such that the higher the vehicle speed VS, the larger the pitch target value and the roll target value, the pitch target value computation unit 48 and the roll target value computation unit 49 suppress changes in behavior related to the pitch orientation and the roll orientation.

According to the electric suspension device 11 based on the fifth aspect, the pitch target value computation unit 48 and the roll target value computation unit 49 respectively correct the pitch target value and the roll target value such that the higher the vehicle speed VS, the larger the pitch target value and the roll target value. Thus, in addition to the advantageous effect achieved by the electric suspension device 11 based on the third aspect, it is possible to enhance the advantageous effect of suppressing changes in behavior related to the pitch orientation and the roll orientation.

Other Embodiments

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the electric suspension device 11 according to the present invention, the electromagnetic actuator 13 to which the rotational driving force of the electric motor 31 converted in the vertical stroke direction is applied has been described as an example of the member corresponding to the actuator according to the present invention. However, the present invention is not limited to this example.

A publicly known mono-tube (de Carbon) adjustable damper as disclosed in, for example, Japanese Patent Application Publication 2015-47906 may be employed as the member corresponding to the actuator according to the present invention. This adjustable damper includes a circular cylinder filled with a magnetorheological fluid (MRF) and a piston rod inserted therein so as to be axially slidable. A piston mounted to the distal end of the piston rod partitions the inside of the cylinder into an upper oil chamber and a lower oil chamber. This piston is provided with a communication channel through which the upper oil chamber and the lower oil chamber communicate with each other, and a MLV coil located inside this communication channel.

Also, in the description of the electric suspension device 11 according to the present invention, the bounce target load characteristic in the bounce target load map 52 has been described by taking the example illustrated in FIG. 4B. However, the present invention is not limited to this example.

In the present invention, the bounce target load characteristic in the bounce target load map 52 is not particularly limited. A necessary bounce target load characteristic may be employed as appropriate.

Also, in the description of the electric suspension device according to the present invention, the pitch target load characteristic in the pitch target load map 72 has been described by taking the example illustrated in FIG. 4C. However, the present invention is not limited to this example.

In the present invention, the pitch target load characteristic in the pitch target load map 72 is not particularly limited. A necessary pitch target load characteristic may be employed as appropriate.

Also, in the description of the electric suspension device 11 according to the present invention, the roll target load characteristic in the roll target load map 82 has been described by taking the example illustrated in FIG. 4D. However, the present invention is not limited to this example.

In the present invention, the roll target load characteristic in the roll target load map 82 is not particularly limited. A necessary roll target load characteristic may be employed as appropriate.

Also, in the description of the electric suspension device 11 according to the present invention, the PR-combined target load characteristic in the PR-combined target load map 104 has been described by taking the example illustrated in FIG. 6B. However, the present invention is not limited to this example.

In the present invention, the PR-combined target load characteristic in the PR-combined target load map 104 is not particularly limited. A necessary PR-combined target load characteristic may be employed as appropriate.

Also, in the description of the electric suspension device 11 according to the present invention, the limit ratio characteristics in the first limit ratio maps 78 and 88 have been described by taking the examples illustrated in FIGS. 4E and 4F. However, the present invention is not limited to these examples.

In the present invention, the limit ratio characteristics in the first limit ratio maps 78 and 88 are not particularly limited. Necessary limit ratio characteristics may be employed as appropriate.

Also, in the description of the electric suspension device 11 according to the present invention, the third limit ratio characteristic in the third limit ratio map 116 has been described by taking the example illustrated in FIG. 6C. However, the present invention is not limited to this example.

In the present invention, the third limit ratio characteristic in the third limit ratio map 116 is not particularly limited. A necessary limit ratio characteristic may be employed as appropriate.

Also, in the description of the electric suspension device 11 according to the present invention, the fourth limit ratio characteristic in the fourth limit ratio map 120 has been described by taking the example illustrated in FIG. 6D. However, the present invention is not limited to this example.

In the present invention, the fourth limit ratio characteristic in the fourth limit ratio map 120 is not particularly limited. A necessary limit ratio characteristic may be employed as appropriate.

Also, the electric suspension device 11 according to the present invention has been described by taking an example in which a total of four electromagnetic actuators 13 are disposed for both the front wheels (front left wheel and front right wheel) and the rear wheels (rear left wheel and rear right wheel). However, the present invention is not limited to this example. A configuration in which a total of two electromagnetic actuators 13 are disposed for either the front wheels or the rear wheels may be employed.

Lastly, in the description of the electric suspension device 11 according to the present invention, the driving control unit 45 has been mentioned which controls the driving of the plurality of electromagnetic actuators 13 independently of each other.

Specifically, the driving control unit 45 may control the driving of the electromagnetic actuators 13 provided for the four wheels independently on a wheel-by-wheel basis.

Alternatively, the driving control unit 45 may control the driving of the electromagnetic actuators 13 provided for the four wheels such that the driving of the electromagnetic actuators 13 on the front wheels is controlled independently of that of the electromagnetic actuators 13 on the rear wheels or the driving of the electromagnetic actuators 13 on the left wheels is controlled independently of that of the electromagnetic actuators 13 on the right wheels.

What is claimed is:

1. An electric suspension device including an actuator that is provided between a body and a wheel of a vehicle and generates damping force for damping vibration of the body, the electric suspension device comprising an Electronic Control Unit (ECU), the ECU configured to:
   acquire a sprung speed and a diagonal wheel sprung speed difference of the vehicle;
   compute a bounce target value for controlling a bounce orientation of the vehicle based on the sprung speed;
   compute a pitch target value for controlling a pitch orientation of the vehicle based on the diagonal wheel sprung speed difference;
   compute a roll target value for controlling a roll orientation of the vehicle based on the diagonal wheel sprung speed difference; and
   control driving of the actuator by using a control target load which is based on a sum of the bounce target value, the pitch target value, and the roll target value.

2. The electric suspension device according to claim 1, wherein the ECU is further configured to:
   acquire information on a pitch rate and a roll rate,
   correct the pitch target value based on information on a more dominant one of the pitch rate and the roll rate,
   the roll target value computation unit corrects more the roll target value based on information on the more dominant one of the pitch rate and the roll rate, and
   control the driving of the actuator by using a control target load that is based on a sum of the bounce target value, the corrected pitch target value, and the corrected roll target value.

3. The electric suspension device according to claim 1, wherein ECU is further configured to:
   acquire information on a vehicle speed of the vehicle, correct the pitch target value based on the vehicle speed such that the higher the vehicle speed, the larger the pitch target value, correct the roll target value based on the vehicle speed such that the higher the vehicle speed, the larger the roll target value, control the driving of the actuator by using a control target load that is based on a sum of the bounce target value, the corrected pitch target value, and the corrected roll target value.

* * * * *